United States Patent
Wang et al.

(10) Patent No.: US 8,683,048 B2
(45) Date of Patent: Mar. 25, 2014

(54) APPARATUS AND METHOD FOR SELECTING IP SERVICES

(75) Inventors: Jun Wang, La Jolla, CA (US); George Cherian, San Diego, CA (US); Masakazu Shirota, Tokyo (JP); Uppinder Babbar, San Diego, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 600 days.

(21) Appl. No.: 12/624,286

(22) Filed: Nov. 23, 2009

(65) Prior Publication Data

US 2010/0138651 A1 Jun. 3, 2010

Related U.S. Application Data

(60) Provisional application No. 61/118,092, filed on Nov. 26, 2008.

(51) Int. Cl.
*G06F 15/16* (2006.01)

(52) U.S. Cl.
USPC .......................................... 709/227; 709/230

(58) Field of Classification Search
USPC ....................................................... 709/227
See application file for complete search history.

(56) References Cited

U.S. PATENT DOCUMENTS

| | | | |
|---|---|---|---|
| 6,978,128 B1 | 12/2005 | Raman et al. | |
| 7,254,119 B2 | 8/2007 | Jiang et al. | |
| 7,710,964 B2 | 5/2010 | Patil et al. | |
| 2006/0045049 A1 | 3/2006 | Chung et al. | |
| 2006/0092878 A1* | 5/2006 | Shirota et al. | 370/331 |
| 2007/0006281 A1* | 1/2007 | Abhinkar et al. | 726/2 |
| 2007/0160049 A1* | 7/2007 | Xie et al. | 370/390 |
| 2007/0208855 A1 | 9/2007 | Yegani et al. | |
| 2007/0254661 A1 | 11/2007 | Chowdhury et al. | |
| 2008/0254768 A1* | 10/2008 | Faccin | 455/411 |
| 2008/0282327 A1* | 11/2008 | Winget et al. | 726/4 |

(Continued)

FOREIGN PATENT DOCUMENTS

| | | |
|---|---|---|
| CN | 1492615 A | 4/2004 |
| JP | 2003018195 A | 1/2003 |

(Continued)

OTHER PUBLICATIONS

3GPP2: "cdma2000 Wireless IP Network Standard: Simple IP and Mobile IP Access Services" Feb. 28, 2006, XP002572802 Retrieved from the Internet: URL:http://www.3gpp2.org/Publi c html/specs / X.S0011-002-D_v1.0_060301.pdf> [retrieved on Mar. 11, 2010].

(Continued)

*Primary Examiner* — Richard G Keehn
(74) *Attorney, Agent, or Firm* — Jeffrey D. Jacobs

(57) ABSTRACT

An apparatus and method for determining an authorized IP service for an access terminal during an establishment of a PPP connection. In an aspect of the disclosure, a data link is established with the access terminal, and a request to authenticate the access terminal is provided to an authentication/authorization server. During authentication, an IP Service Authorized Parameter is provided by the authentication/authorization server, the IP Service Authorized Parameter for indicating the authorized IP service for the access terminal. Thereby, a network layer protocol and a mobility protocol are each configured according to the authorized IP service that corresponds to the IP Service Authorized Parameter.

60 Claims, 17 Drawing Sheets

(56) References Cited

U.S. PATENT DOCUMENTS

| | | | |
|---|---|---|---|
| 2010/0017528 A1* | 1/2010 | Awano | 709/230 |
| 2010/0046434 A1* | 2/2010 | Weniger et al. | 370/328 |
| 2010/0100631 A1 | 4/2010 | Lioy et al. | |

FOREIGN PATENT DOCUMENTS

| | | |
|---|---|---|
| JP | 2009526487 A | 7/2009 |
| TW | 448658 | 8/2001 |
| WO | WO0141470 | 6/2001 |
| WO | WO2007092617 | 8/2007 |

OTHER PUBLICATIONS

3GPP2: "Network PMIP Support Revision A" 3GPP2-Drafts, 3GPP2 X.S0054-220-A Aug. 29, 2008, XP002572801 Retrieved from the Internet: URL:http://www.3gpp2.org/Publi cjitml/specs /X.S0054-220-A_v1.0_080909.pdf> [retrieved on Mar. 11, 2010] the whole document.

Chiba T et al: "Mobility Management Schemes for Heterogeneity Support in Next Generation Wireless Networks" Next Generation Internet Networks, 3rd EURONGI Conference on, IEEE, PI, May 1, 2007, pp. 143-150, XP031176439 ISBN: 978-1-4244-0856-6 Section V: mobility solutions for roaming scenarios.

International Search Report & Written Opinion—PCT/US2009/065808, International Search Authority—European Patent Office—Apr. 7, 2010.

Simpson W et al: "The Point-to-Point Protocol (PPP); r f c 1 6 6 1 . t x t" IETF Standard, Internet Engineering Task Force, IETF, CH, Jul. 1, 1994, XP015007448 ISSN: 0000-0003.

"Network PMIP Support" 3rd Generation Partnership Project 2 3GPP2 No. Version 1.0, Dec. 5, 2008, pp. 1-43, XP007912107 sections 3.22 & 4.22.

3rd Generation Partnership Project 2, cdma2000 Wireless IP network Standard: Simple IP and Mobile IP services, 3GPP2 X.S0011-002-C, V3.0, Oct. 2006.

Taiwan Search Report—TW098140429—TIPO—Mar. 12, 2013.

3rd Generation Partnership Project 2, cdma2000 Wireless IP network Standard: Simple IP and Mobile IP services, 3GPP2 X.S0011-001-C, V3.0, Oct. 2006.

* cited by examiner

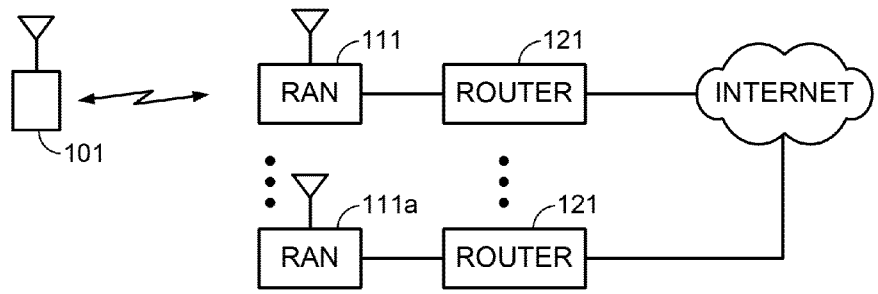
FIG. 1 SIMPLE IP
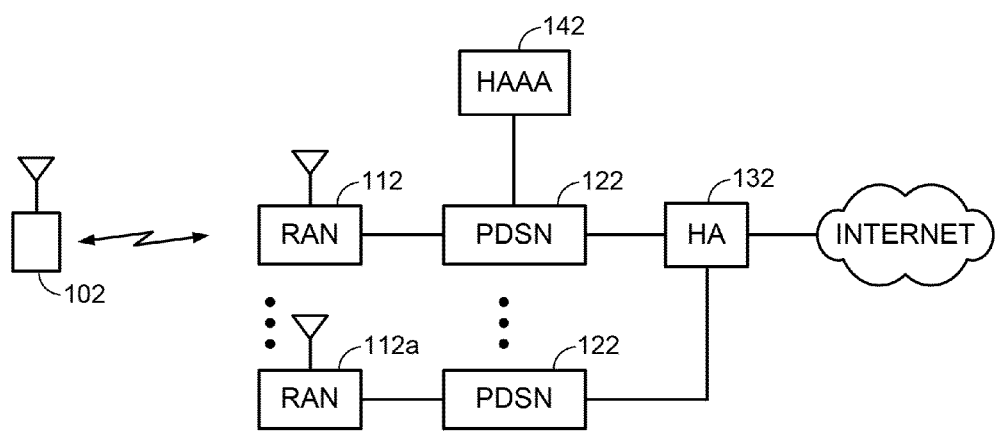
FIG. 2 MOBILE IP
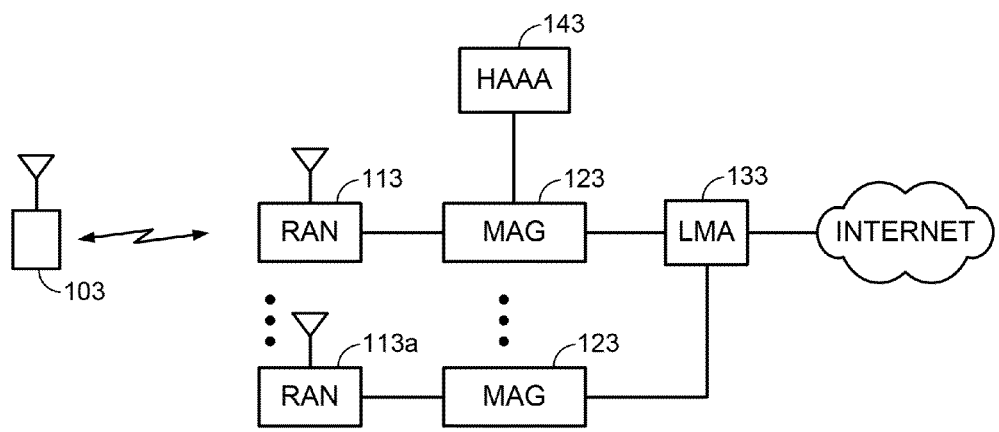
FIG. 3 PROXY MOBILE IP

APPARATUS AND METHOD FOR SELECTING IP SERVICES

CLAIM OF PRIORITY UNDER 35 U.S.C. §119

The present Application for Patent claims priority to Provisional Application No. 61/118,092, titled AUTHORIZATION & SELECTION OF IP SERVICES, filed Nov. 26, 2008, and assigned to the assignee hereof and hereby expressly incorporated by reference herein.

BACKGROUND

1. Field

The present disclosure relates generally to communication systems, and more particularly, to the selection among IP services in a wireless communications system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In applications involving multiple processing devices, such as computers and the like, a suitable network is frequently used to exchange data. Associated with any communications network is set of access protocols that enable a communications path to be established between devices. Various access protocols have been standardized over time to allow an application in any processing device that supports a specific standard to communicate freely with an application in another processing device supporting the same standard.

One important access protocol is the Internet Protocol (IP) Suite (also referred to as TCP/IP), which has gained prominence in networks incorporating communication across a packet-switched network. As a part of this protocol, devices on the network are each assigned a unique IP address for identification.

Various network layer protocols exist within the IP Suite, some of which provide mobility. That is, a protocol that provides mobility allows an access terminal to maintain a network layer connection even while it changes location from an area serviced by one access gateway to an area serviced by another access gateway. For example, simple IP (IPv4 and IPv6) services do not provide mobility. On the other hand, client mobile IP and proxy mobile IP services provide mobility.

Certain network systems are capable of servicing access terminals with more than one network layer protocol. In these systems, there may be some difficulty in ascertaining which protocol to use for a particular access terminal. This problem is exacerbated by the fact that the signaling transmitted by an access terminal utilizing simple IP is identical to the signaling transmitted by an access terminal utilizing proxy mobile IP. For example, an access terminal may assume that proxy mobile IP, and thus, mobility, is available, and utilize simple IP signaling; while the network is not aware that the access terminal desired mobility, and provides a simple IP address.

Thus, there is a desire in the field for improved management of network layer protocols over IP networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a method for determining an authorized IP service for an access terminal during an establishment of a PPP connection includes establishing a data link with the access terminal, requesting an authentication/authorization server to authenticate the access terminal, receiving an IP Service Authorized Parameter from the authentication/authorization server, the IP Service Authorized Parameter for indicating the authorized IP service for the access terminal, and configuring a network layer protocol according to the authorized IP service that corresponds to the IP Service Authorized Parameter.

According to another aspect of the disclosure, a method for determining an authorized IP service for an access terminal during an establishment of a PPP connection includes establishing a data link with an access gateway, providing identifying information to identify the access terminal to the access gateway, receiving data indicative of the authorized IP service, the data corresponding to an IP Service Authorized Parameter, the IP Service Authorized Parameter for indicating the authorized IP service, and establishing an IP connection with the access gateway by utilizing the authorized IP service.

According to yet another aspect of the disclosure, a processor configured to determine an authorized IP service for an access terminal during an establishment of a PPP connection includes a first module for establishing a data link with the access terminal, a second module for requesting an authentication/authorization server to authenticate the access terminal, a third module for receiving an IP Service Authorized Parameter from the authentication/authorization server, the IP Service Authorized Parameter for indicating the authorized IP service for the access terminal, and a fourth module for configuring a network layer protocol according to the authorized IP service that corresponds to the IP Service Authorized Parameter.

According to yet another aspect of the disclosure, a processor configured to determine an authorized IP service for an access terminal during an establishment of a PPP connection includes a first module for establishing a data link with an access gateway, a second module for providing identifying information to identify the access terminal to the access gateway, a third module for receiving data indicative of the authorized IP service, the data corresponding to an IP Service Authorized Parameter, the IP Service Authorized Parameter for indicating the authorized IP service, and a fourth module for establishing an IP connection with the access gateway by utilizing the authorized IP service.

According to yet another aspect of the disclosure, a computer program product includes a computer-readable medium including code for establishing a data link with the access terminal, code for requesting an authentication/authorization server to authenticate the access terminal, code for receiving an IP Service Authorized Parameter from the authentication/authorization server, the IP Service Authorized Parameter for indicating the authorized IP service for the access terminal, and code for configuring a network layer protocol according to the authorized IP service that corresponds to the IP Service Authorized Parameter.

According to yet another aspect of the disclosure, a computer program product includes a computer-readable medium including code for establishing a data link with an access gateway, code for providing identifying information to identify the access terminal to the access gateway, code for receiving data indicative of the authorized IP service, the data corresponding to an IP Service Authorized Parameter, the IP Service Authorized Parameter for indicating the authorized IP service and code for establishing an IP connection with the access gateway by utilizing the authorized IP service.

According to yet another aspect of the disclosure, an apparatus for wireless communication includes means for establishing a data link with the access terminal, means for requesting an authentication/authorization server to authenticate the access terminal, means for receiving an IP Service Authorized Parameter from the authentication/authorization server, the IP Service Authorized Parameter for indicating the authorized IP service for the access terminal, and means for configuring a network layer protocol according to the authorized IP service that corresponds to the IP Service Authorized Parameter.

According to yet another aspect of the disclosure, an apparatus for wireless communication includes means for establishing a data link with an access gateway, means for providing identifying information to identify the access terminal to the access gateway, means for receiving data indicative of the authorized IP service, the data corresponding to an IP Service Authorized Parameter, the IP Service Authorized Parameter for indicating the authorized IP service, and means for establishing an IP connection with the access gateway by utilizing the authorized IP service.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 1 is a block diagram illustrating a Simple IP network;

FIG. 2 is a block diagram illustrating a Client Mobile IP network;

FIG. 3 is a block diagram illustrating a Proxy Mobile IP network;

DETAILED DESCRIPTION

Figure 4:
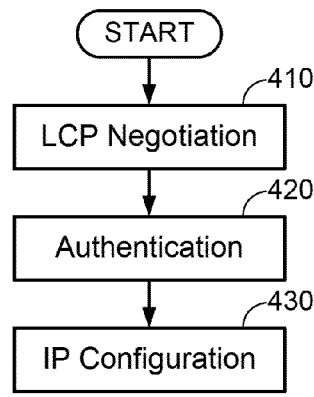
FIG. 4 is a flow chart illustrating the IP service configuration during the establishment of a PPP connection.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 18:
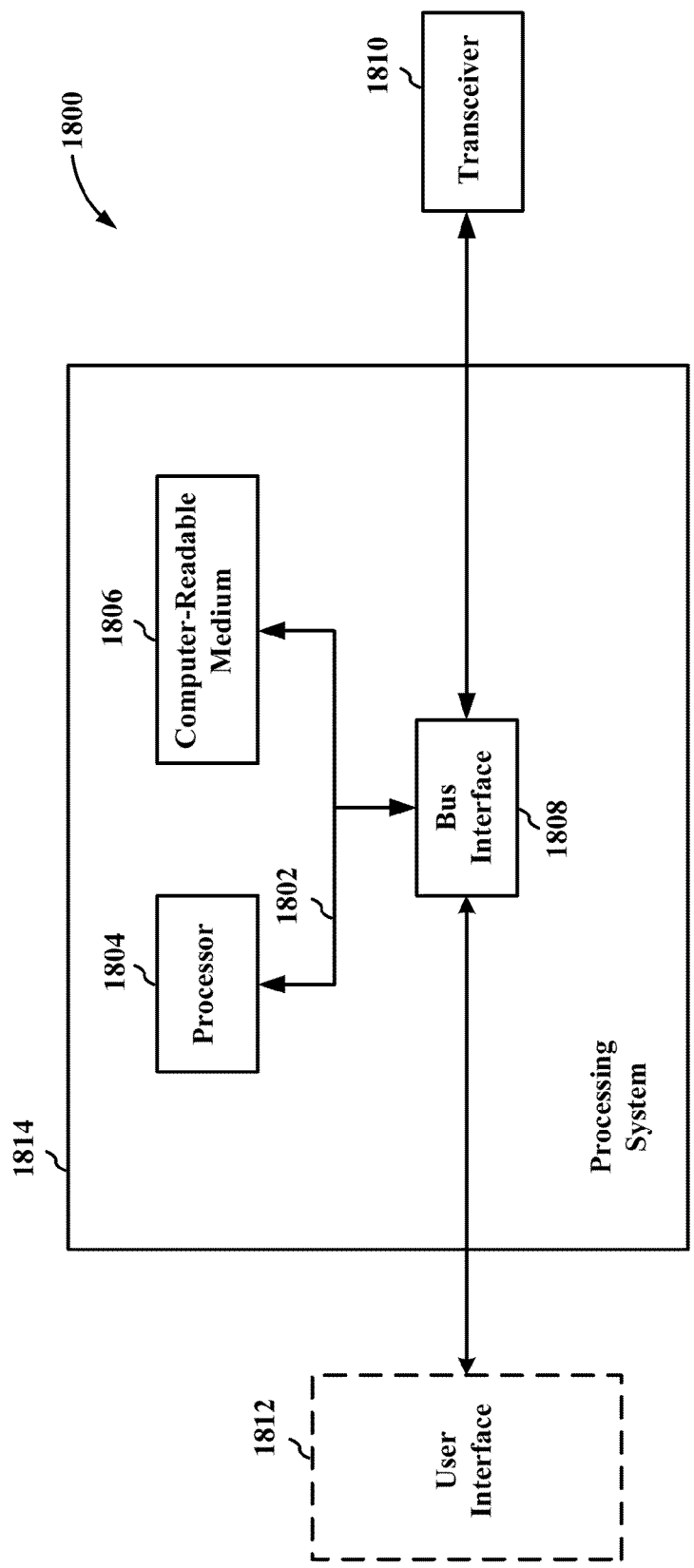
FIG. 18 is a conceptual diagram illustrating an example of a hardware implementation for an apparatus employing a processing system.

FIG. 18 is a conceptual diagram illustrating an example of a hardware implementation for an apparatus 1800 employing a processing system 1814. In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 links together various circuits including one or more processors, represented generally by the processor 1804, and computer-readable media, represented generally by the computer-readable medium 1806. The bus 1802 may also link various other circuits such as timing sources, peripherals, voltage regulators, and power management circuits, which are well known in the art, and therefore, will not be described any further. A bus interface 1808 provides an interface between the bus 1802 and a transceiver 1810. The transceiver 1810 provides a means for communicating with various other apparatus over a transmission medium. Depending upon the nature of the apparatus, a user interface 1812 (e.g., keypad, display, speaker, microphone, joystick) may also be provided.

The processor 1804 is responsible for managing the bus 1802 and general processing, including the execution of software stored on the computer-readable medium 1806. The software, when executed by the processor 1804, causes the processing system 1814 to perform the various functions described infra for any particular apparatus. The computer-readable medium 1806 may also be used for storing data that is manipulated by the processor 1804 when executing software.

Figure 19:
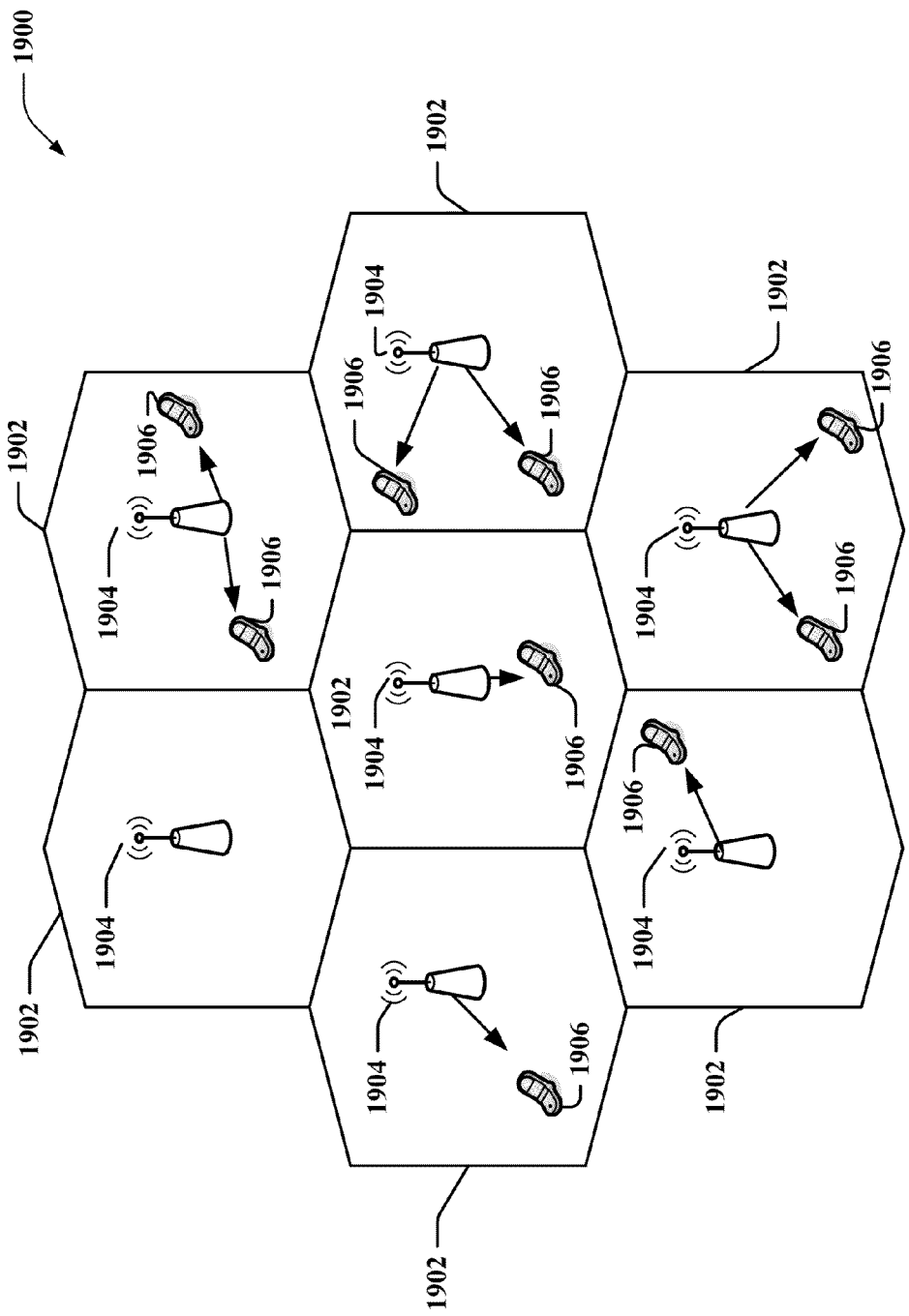
FIG. 19 is a conceptual diagram illustrating an example of an access network.

An example of an access network will now be presented with reference to FIG. 19. In this example, the access network 1900 is divided into a number of cellular regions (cells) 1902. An base station 1904 is assigned to a cell 1902 and is configured to provide an access point to a core network for all the access terminals 1906 in the cell 1902. There is no centralized controller in this example of an access network 1900, but a centralized controller may be used in alternative configurations. The base station 1904 may be responsible for all radio related functions including radio bearer control, admission control, mobility control, scheduling, security, and connectivity to a serving gateway in a core network.

The processing system 1800 described in relation to FIG. 18 may include the base station 1904. In one configuration, the processing system 1800 is configured to determine an authorized IP service for an access terminal.

On the other hand, the processing system 1800 described in relation to FIG. 18 may include the access terminal 1906. In one configuration, the processing system 1800 is configured to determine and access an authorized IP service during the establishment of a PPP connection.

As used herein, a "mobility preference" is an indication from an Access Terminal (AT) as to whether or not the AT would prefer mobility, and an AT with no mobility preference is understood to mean that a configuration that lacks mobility is acceptable for the AT. Mobility generally refers to a capability to maintain a network-layer connection during handoff from an area covered by one access gateway (AGW) to an area covered by another AGW.

FIG. 1 illustrates portions of a network implementing a simple IP protocol (e.g., IPv4, IPv6) for cellular applications. In FIG. 1, an access terminal 101 (e.g., a mobile phone or other computer or host capable of communicating over a radio link) is shown in communication with a radio access network (RAN) 111. The RAN 111 typically includes a collection of base stations and one or more base station controllers. The RAN 111 can be used to transport packets between multiple access terminals 101. For ease of explanation, only one access terminal 101 is shown. Further, only one RAN 111 is shown coupled to each router 121. However, as one skilled in the art will recognize, in some systems, more than one access terminal 101 may be in communication with any RAN 111, and more than one RAN 111 may be connected to any one router 121.

The RAN 111 may be further connected to additional networks outside the radio network, such a wide area network (WAN), a local area network (LAN), or any other type of communications network, and may transport packets between each access terminal and such outside networks. The packets may include voice, data, video, or any other type of information.

The access terminal 101 can access a network (e.g., the Internet) by first establishing an air link with the RAN 111. For the purposes of this disclosure, the term air link will be used to refer to a wireless traffic channel between an access terminal and a RAN. Once the air link is established, a data link can be established between the access terminal 101 and the router 121 in accordance with a PPP link layer protocol, described in further detail below. Next, the PPP link layer protocol can be utilized to negotiate an IP address to assign to the access terminal 101. Once an IP address is assigned, data packet transfer can occur over the network connection.

FIG. 2 illustrates a system utilizing a mobile IP protocol. Mobile IP (MIPv4 and MIPv6, together referred to as mobile IP, or "client mobile IP" (CMIP) for easier distinction from proxy mobile IP (PMIP), discussed below) is a standard communications protocol that provides a mobility function to an access terminal. That is, an access terminal has mobility when its network connection is maintained although the access terminal changes its network access point from one PDSN 122 to another.

In the system of FIG. 2, an access terminal 102 establishes an air link with a RAN 112, which thereby establishes a data link with a packet data serving node (PDSN) 122, sometimes referred to as an access gateway (AGW). In MIPv4 applications, the PDSN 122 may be further configured to function as a foreign agent (FA). The PDSN 122 is generally a router that manages the connection between the RAN 112 and a home agent (HA) 132. The HA 132 is a router within the home network of the access terminal 102, which permanently stores information about the mobile access terminal 112 and provides the PDSN 122 with an IP address, which the PDSN 122 thereby assigns to the access terminal 102.

In contrast to simple IP, mobile IP involves certain signaling between the access terminal 102 and the HA 132, which binds the access terminal to the home agent and maintains an IP connection when the access terminal changes its point-of-attachment to the network. Thus, because of the need for the access terminal to perform suitable signaling with its home agent, when utilizing mobile IP the access terminal is "aware" that it is mobile, and applications that are designed to function over a simple IP connection may not function properly on a mobile IP network.

For example, applications designed to run on a laptop computer are typically designed to utilize simple IP. However, if a user desires to connect the laptop to the Internet through their cellular network by using a mobile access card, compatibility issues may arise unless the mobile access card is particularly configured to handle the mobile IP signaling on the behalf of the laptop.

FIG. 3 illustrates a system utilizing the proxy mobile IP (PMIP) protocol. In FIG. 3, an access terminal 103 establishes an air link with a RAN 113, which thereby establishes a data link with a mobile access gateway (MAG) 123, sometimes referred to simply as an access gateway (AGW). The MAG 123 manages the connection between the RAN 113 and a local mobility agent 133.

In contrast with a CMIP network, in a PMIP network, the network handles the mobility function on behalf of the access terminal, enabling an access terminal that only utilizes simple IP signaling to have mobility. From the perspective of the access terminal, PMIP signaling is the same as simple IP signaling, and the MAG 123 behaves in the same way as the router 121 illustrated in FIG. 1 as far as the access terminal interface is concerned.

For example, in the same way as the access terminal 101 in FIG. 1, the access terminal 103 requests a simple IP address from the MAG 123 utilizing simple IP signaling, and the MAG 123 assigns an IP address to the access terminal 103. It appears to the access terminal 103 that the MAG 123 assigned an IP address from a pool of IP addresses in the same way that the router 121 would have done in a simple IP system. However, in the PMIP system, the MAG 123 communicates with the LMA 133 to manage a binding between the access terminal 103 and the LMA 133, revoking and re-assigning the binding to the appropriate MAG 123 depending on which RAN 113 is currently in radio communication with the access terminal 103. Thus, while it appears to the access terminal 103 that it is always in communication with the same router 123, in reality it may be mobile between multiple MAGs 123. In this way, mobility is available to legacy access terminals that are only capable of simple IP signaling.

Thus, while PMIP addresses the issue of legacy applications or access terminals that lack functionality on CMIP networks, as will be discussed below, PMIP presents other issues related to the fact that, because the access terminal utilizes the same signaling for simple IP and PMIP, the access terminal does not "know" whether its IP address assignment provides it with mobility.

For example, it can generally be assumed that a user would prefer that their access terminal utilize a protocol that enables mobility over one that does not. Thus, if the access terminal is capable of performing simple IP signaling and CMIP signaling, the access terminal would prefer either a PMIP system (by utilizing simple IP signaling) or a CMIP system over a simple IP system. However, if that access terminal is in an area where the network is capable of supporting only simple IP and CMIP, and if the access terminal incorrectly assumes that the network supports PMIP and requests an IP address from the network utilizing simple IP signaling, the network will simply grant a simple IP address, and mobility will not be enabled. That is, the access terminal will be stuck with a simple IP address, and when the access terminal moves from an area corresponding to one PDSN to an area corresponding to another PDSN, the access terminal will be assigned a new IP address and the connection will be lost. Also, the access terminal may lose the home service if the access terminal is only granted with the simple IP assigned by the local router when the access terminal is in the visited network.

In this scenario, because both the access terminal and the network were capable of CMIP, if the access terminal had been aware that PMIP were unavailable in the network, it would achieve its preference of mobility had it utilized CMIP signaling in the first instance rather than simple IP signaling. However, there is no conventional protocol to differentiate between a simple IP network and a PMIP network, so the access terminal, assuming that PMIP is available, ends up with a simple IP address.

Further, even in some situations where a network is capable of supporting PMIP, the network may deny mobility to a particular access terminal based on restrictions or other operator policies in effect. For example, mobility may be a premium service available only to paid subscribers, or may be denied to a roaming mobile outside of a specified area.

On the other hand, in some situations, an access terminal may prefer to establish a simple IP connection rather than having PMIP enabled, even if PMIP were available. For example, in a home network including a local printer, the printer is assigned a different IP address than the home computer. However, in a PMIP network, when the printer requests an IP address, the request is handled by the network, and the IP address is assigned differently, causing the home user to be unable to access the local printer. In such a situation, a breakout of the local network would be preferred, such that the home equipment receives a simple IP address assignment when requested.

In various aspects of the instant disclosure, the Point-to-Point Protocol (PPP) is described as an exemplary protocol utilized to establish, configure, and test a data link connection for transporting packets between two peers. PPP is a standard protocol defined in Internet Engineering Task Force (IETF) Request for Comments (RFC) 1661, the contents of which are incorporated herein by reference. However, one skilled in the art will comprehend that various other suitable protocols may be utilized to establish a data link connection, and the invention is not limited to embodiments utilizing PPP, but includes these other protocols as well.

As illustrated in FIG. 4, within a system implementing PPP, a data link and an IP connection on the data link are typically established in three phases: link control protocol (LCP) negotiation 410; authentication 420; and IP configuration 430. While the authentication phase is optional within the PPP standard, the aspects disclosed herein each include some form of authentication.

LCP negotiation 410 initially establishes a data link between the peers. During LCP negotiation, each end of the PPP link sends LCP packets to configure and test the data link.

After the establishment of the data link, the authentication phase 420 is where one peer (e.g., a router) requires another peer (e.g., a mobile access terminal) to authenticate itself.

After the peer identifies itself and gives its credentials, the network verifies it. In general, authentication includes signaling between a router such as an AGW, and an authentication, authorization (or access control) and accounting (AAA) server that houses information about the access terminal and verifies the credentials.

Some examples of standard authentication protocols include the password authentication protocol (PAP), the challenge-handshake authentication protocol (CHAP), and the extensible authentication protocol (EAP). Those skilled in the art will be familiar with these and other authentication protocols, the details of which are omitted from this disclosure.

After establishment of the data link and authentication, the IP configuration phase 430 is the network-layer protocol phase of PPP. That is, a network control protocol (NCP) establishes network-layer configuration of the connection between the peers. Any of a number of suitable network configuration protocols may be utilized, including Internet protocol control protocol (IPCP, for example, as defined in IETF RFC 1332, the entire content of which is incorporated herein by reference), Internet protocol version 6 control protocol (IPv6CP, for example, as defined in IETF RFC 2472, the entire content of which is incorporated herein by reference), and a vendor-specific network control protocol (VSNCP), among others.

Within different IP services, such as simple IP, CMIP, and PMIP, the details of the second and third phases of PPP, that is, authentication and IP configuration, are different. Specifically, CMIP utilizes different signaling for its authentication and IP configuration than do simple IP and PMIP. Once again, specific details about the differences between these protocols are known to those skilled in the art and are therefore largely omitted herein.

As discussed above, an access terminal utilizes IP services including simple IP, CMIP, and PMIP. In more detail, the IP services can be broken down into the following protocols:
  Internet protocol version 4 (IPv4);
  Internet protocol version 6 (IPv6);
  Mobile Internet protocol version 4 (MIPv4);
  Mobile Internet protocol version 6 (MIPv6); (in general, if MIPv6 is authorized, IPv6 is also authorized);
  IPv4 with proxy mobile Internet protocol version 4 (PMIPv4);
  IPv4 with proxy mobile Internet protocol version 6 (PMIPv6);
  IPv6 with PMIPv4; and/or
  IPv6 with PMIPv6.

Of course, as noted above, MIPv4 and MIPv6 are together referred to herein as client mobile IP (CMIP) for easier distinction from PMIP. Further, IPv4 and IPv6 are together referred to as simple IP.

In an aspect, during the authentication phase 420, information corresponding to the identity of the access terminal is communicated from the AGW to the AAA server. The AAA server then indicates to the AGW which one or more of these IP services the access terminal is authorized for. Thereby, the AGW appropriately signals to the access terminal to grant or deny access to the appropriate IP services, some of which include a mobility function, as discussed above.

To provide the AGW with information indicating authorized IP services for the access terminal, an IP Service Authorized Parameter is included in the signaling from the AAA to the AGW. That is, the IP Service Authorized Parameter is an information element exchanged between the AAA and the AGW, which indicates, in part, what type of mobility is available for an access terminal establishing a PPP connection.

Figure 5:
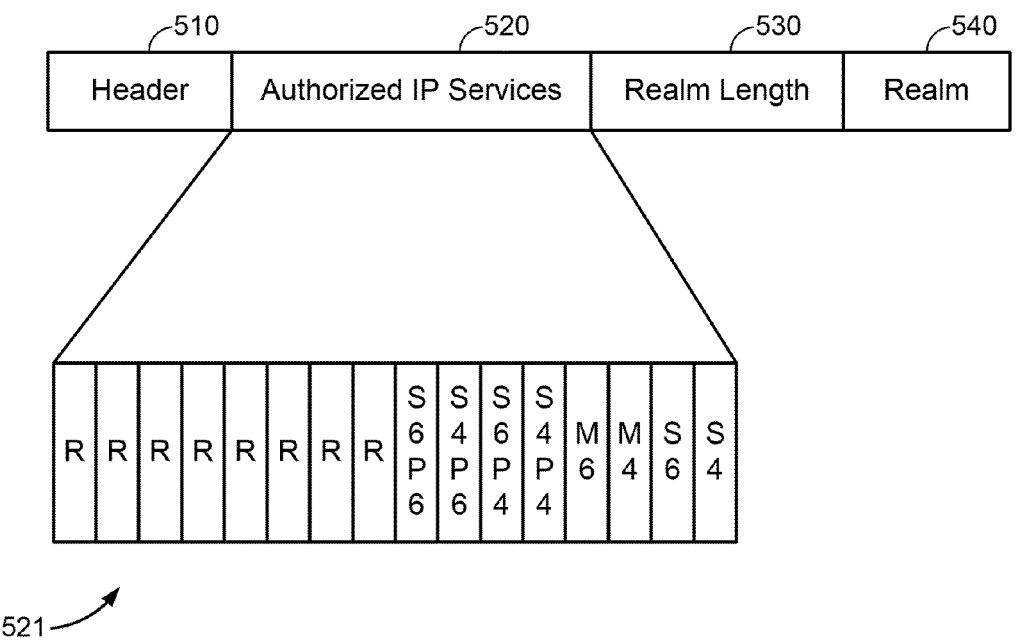
FIG. 5 is a bit map illustrating an example of an IP Service Authorized Attribute.

FIG. 5 is a bit map illustrating a simplified example of an authentication protocol including an additional information element, namely, an IP Service Authorized Parameter, according to one aspect of the instant disclosure. Those skilled in the art will recognize that there are any number of authentication protocols, such as, for example, RADIUS VSA, which may be utilized in any particular embodiment, and the particularities of bit and information placement illustrated herein are only intended to be illustrative and not limiting in effect.

In FIG. 5, a data packet according to the simplified authentication protocol includes a header 510 which, according to various protocols, may identify the type of packet being sent, its length, and so forth. Following the header 510 is Authorized IP Services field 520; Realm Length field 530; and Realm 540.

In one aspect, the Authorized IP Services field 520 includes the IP Service Authorized Parameter, as indicated in the expanded bit map 521. The eight least significant bits in the illustration each represent an authorized IP service. In the diagram, S4 indicates simple IPv4 service; S6 indicates simple IPv6 service; M4 indicates mobile IPv4 service; M6 indicates mobile IPv6 service; S4P4 indicates simple IPv4 and proxy mobile IPv4 services; S6P4 indicates simple IPv6 and proxy mobile IPv4 services; S4P6 indicates simple IPv4 and proxy mobile IPv6 services; and S6P6 indicates simple Ipv6 and proxy mobile IPv6 services. In the illustration, another eight more significant bits are reserved for flexibility in the indication of other IP services, or other combinations of IP services in the future.

The realm length field 530 indicates the length of the realm field 540. The realm field 540 includes information specifying the realm that allows the IP services specified in the IP Service Authorized Parameter in the Authorized IP Services field 520. That is, in certain aspects, the IP services that are authorized in accordance with the IP Service Authorized Parameter are spatially limited.

In order to utilize the IP Service Authorized Parameter as described above, there are further issues related to whether the network is aware that the access terminal is capable of different IP services, and similarly, whether the access terminal is aware that the network is capable of IP service authorization. Below, a number of examples are described as exemplary aspects of the disclosure to illustrate various protocols for implementing IP service authorization, each utilizing the IP Service Authorized Parameter. The descriptions of the various examples correspond to the call flow diagrams of FIGS. 6-17.

Option 1

Figure 6:
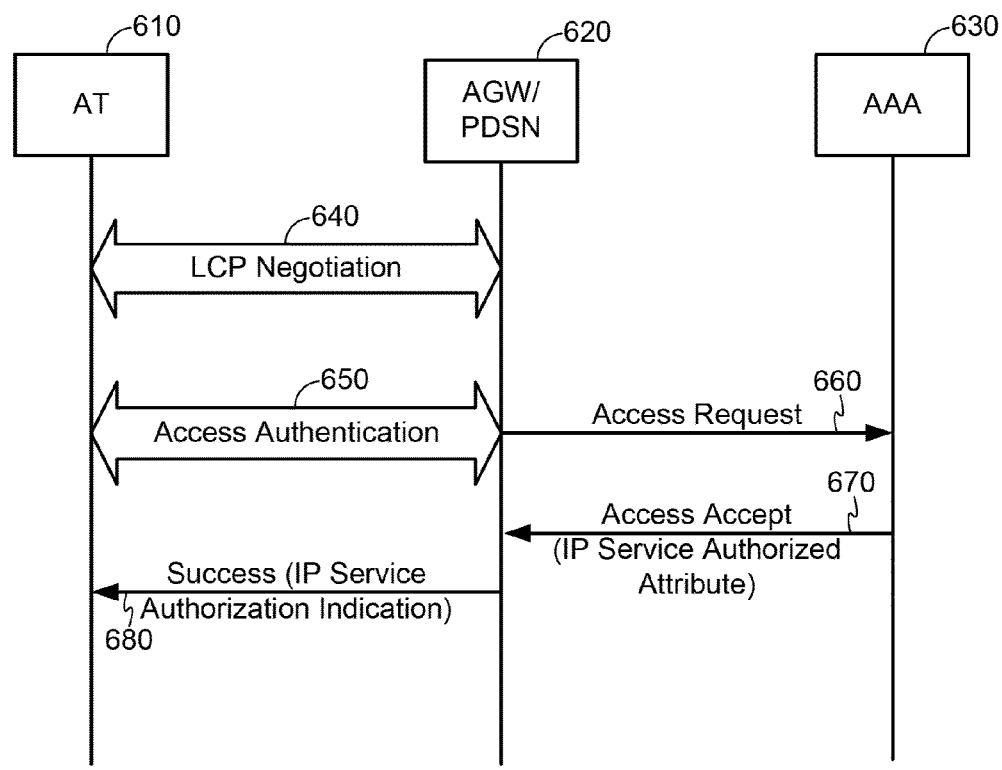
FIG. 6 is a call flow diagram illustrating an exemplary configuration where IP services authorization is accomplished during the authentication phase.

In one example, the authorization of IP services may be accomplished during the authentication phase of the establishment of a PPP connection, as illustrated in the call flow diagram of FIG. 6. As previously indicated in FIG. 4, a PPP operation is initiated with a link control protocol (LCP) negotiation 640 between the Access Terminal (AT) 610 and the access gateway (AGW) 620. Upon the establishment of the data link, the system begins the authentication phase. In this example, the authentication phase may be performed utilizing simple IP signaling: that is, signaling typically utilized to initiate a connection under IPv4 or IPv6 service. During authentication, the AT 610 presents Access Authentication information 650 including identifying information and credentials. The AGW 620 communicates corresponding information as a part of an Access Request 660 to the AAA server 630 in that AT's home network. The AAA server 630 thereby communicates the IP services that are available for that AT 610 back to the AGW 620 as a part of an Access Accept message 670. That is, the AAA 630 sends the IP Service Authorized Parameter to the AGW 620 during the authentication phase. The AGW 620 thereby communicates this information back to the AT 610 during the authentication phase. That is, the AGW 620 communicates an IP service authorization indication to the AT 610 as a part of an authentication success message.

In this example, if the IP Service Authorized Parameter (communicated from the AAA 630 to the AGW 620) indicates that PMIP service is authorized, the AT 610 may enter the IP configuration phase utilizing simple IP signaling, being assured that mobility will be available. If, on the other hand, PMIP service is not authorized, but CMIP is authorized, and if the AT 610 desires mobility, the authentication phase may be re-started utilizing CMIP signaling. Thereafter, the AT 610 may request IP configuration utilizing CMIP signaling. Thus, whether PMIP is authorized or not, the AT 610 will achieve its desired mobility. Note that the data link, established during LCP negotiation, remains, and it is not necessary to repeat the LCP negotiation phase.

If the IP Service Authorized Parameter indicates that PMIP is not authorized, and a simple IP connection is acceptable to the AT 610, then the AT 610 generally does not re-start the authentication phase, and maintains the authentication that it has already established, and enters the IP configuration phase utilizing simple IP signaling, receiving a simple IP address without mobility.

If neither PMIP nor CMIP are authorized, the AT 610 may enter the IP configuration phase utilizing simple IP signaling irrespective of any mobility preference. The AT may then be assigned a simple IP address, with the system maintaining network-layer communication utilizing simple IP signaling.
Option 2

Figure 7:
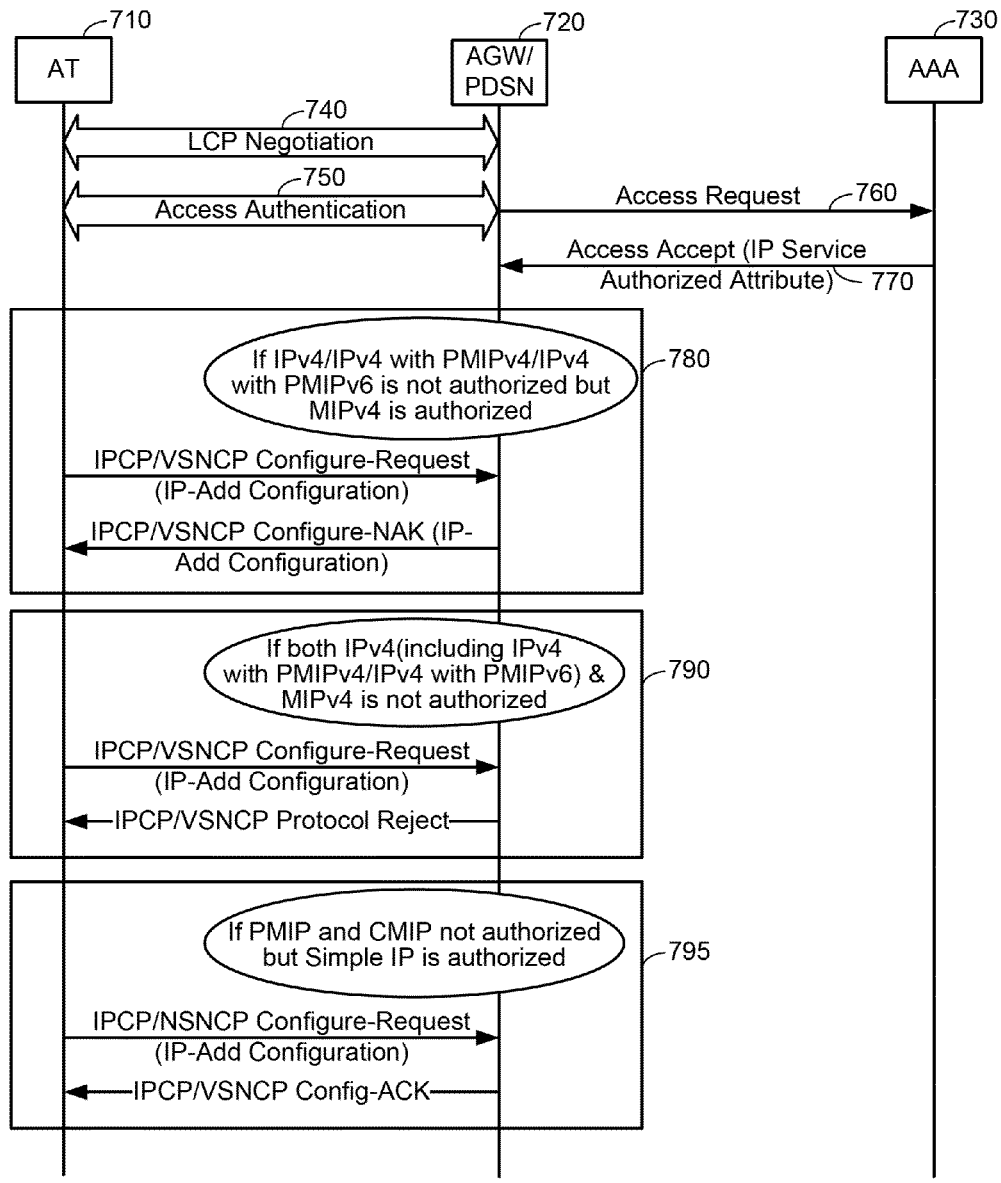
FIG. 7 is a call flow diagram illustrating an exemplary configuration where IP services authorization is accomplished during the IP configuration phase.
Figure 8:
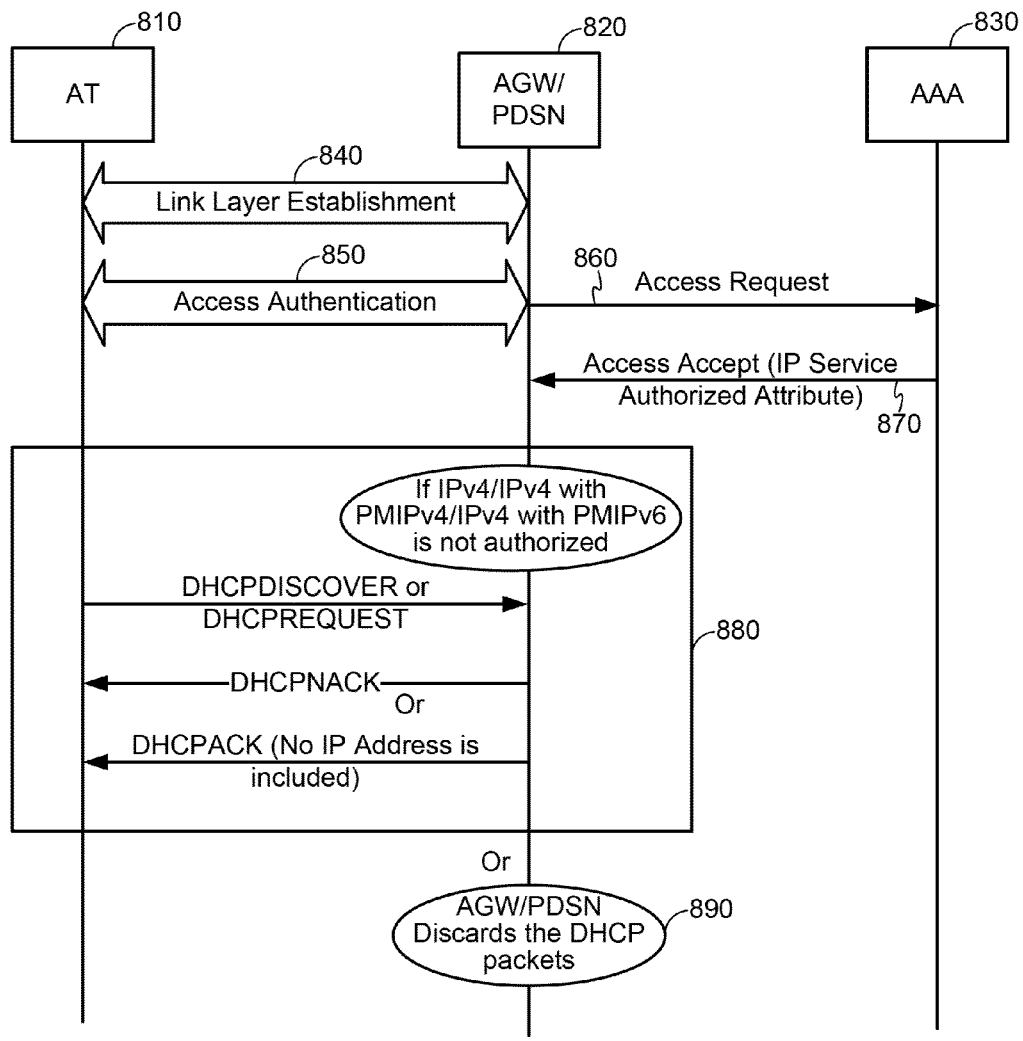
FIG. 8 is a call flow diagram illustrating another exemplary configuration where IP services authorization is accomplished during the IP configuration phase.
Figure 9:
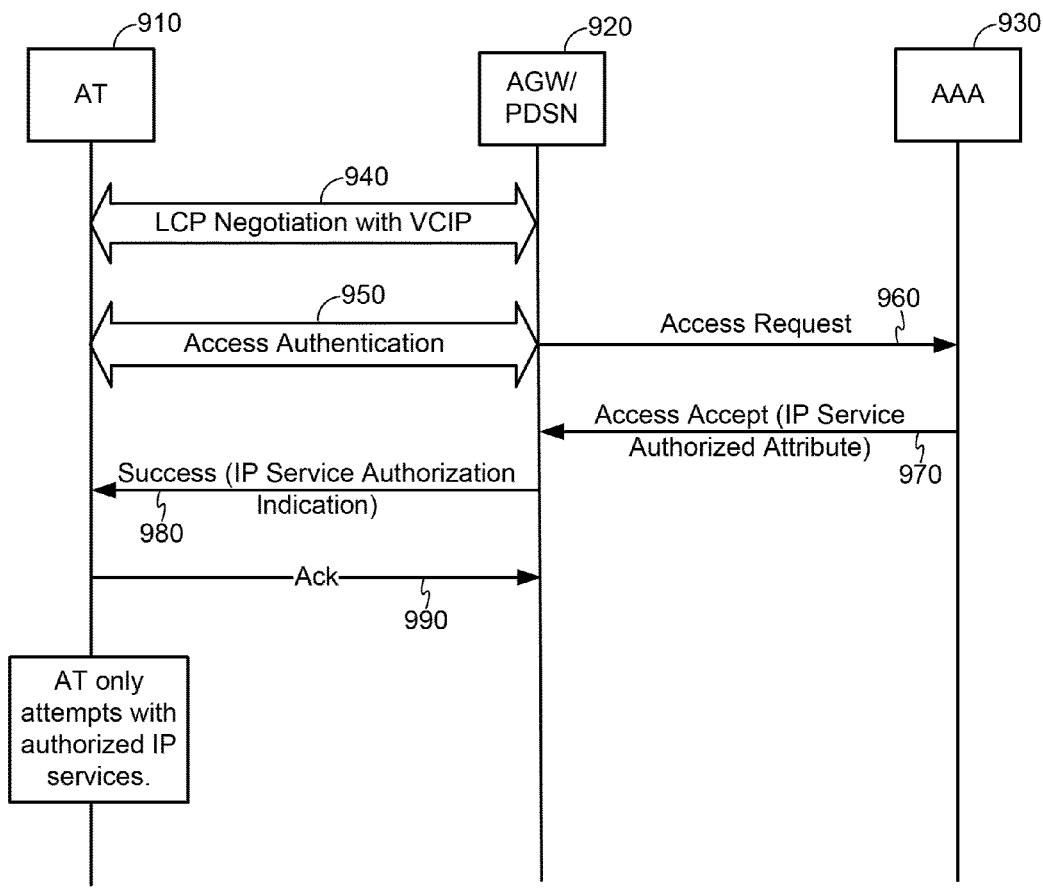
FIG. 9 is a call flow diagram illustrating an exemplary configuration where IP services authorization is accomplished at an intermediate period between or including the authentication phase and the IP address assignment phase.

In another example, the authorization of IP services may be accomplished during the IP configuration phase of the establishment of a PPP connection, as illustrated in the call flow diagrams of FIGS. 7-8. FIG. 7 illustrates this example if NCP or VSNCP is utilized; FIG. 8 illustrates this example if DHCP is utilized.

In the example illustrated by the call flow diagram of FIG. 7, where NCP or VSNCP is utilized, a PPP connection is initiated with a LCP negotiation 740 between the AT 710 and the AGW 720 to establish a data link. Upon the establishment of the data link, the system begins the authentication phase. In this example, the authentication phase may be performed utilizing simple IP signaling (e.g., by utilizing PAP, CHAP, or EAP). During authentication, the AT 710 presents Access Authentication information 750 including identifying information and credentials. The AGW 720 communicates corresponding information as a part of an Access Request 760 to the AAA server 730 in that AT's home network. The AAA server 730 thereby communicates the IP services that are available for that AT 710 back to the AGW 720 as a part of an Access Accept message 770. That is, the AAA 730 sends the IP Service Authorized Parameter to the AGW 720 during the authentication phase.

In the IP configuration phase, as already discussed, this example utilizes a network configuration protocol (NCP) such as Internet Protocol Configuration Protocol (IPCP) or a Vendor-Specific NCP (VSNCP) to obtain the IP address. Thus, the AT 710 sends an IPCP or VSNCP Configure-Request. If, as illustrated in block 780, in accordance with the IP Service Authorized Parameter, PMIP is not authorized but CMIP is authorized, the AGW 720 responds with a Configure-NAK message. On the other hand, as illustrated in block 790, if none of simple IP, PMIP, or CMIP is authorized, the AGW 720 responds with a protocol reject message. Finally, if PMIP and CMIP are not authorized but simple IP is authorized, as illustrated in block 795, the AGW 720 responds with a Configure-ACK message with an IP address assignment for Simple IP.

FIG. 8 is a call flow diagram illustrating another variation of this example, wherein DHCP is utilized to obtain the IP address. DHCP is a commonly utilized protocol to obtain a simple IP address. Such a system that utilizes DHCP has an advantage that legacy systems may utilize this system, as the signaling is the same from the AGW side. Note that the AT still may require changes from a legacy AT to incorporate the disclosed modifications to the typical DHCP requests.

In FIG. 8, a Link Layer connection is established at arrow 840. In one example, the Link Layer Establishment 840 may be substantially the same as the LCP Negotiation described above with respect to FIG. 7. Further, Access Authentication 850 and Access Request 860 and Accept 870 may also be substantially the same as those described immediately above with respect to FIG. 7. Here, in block 880, e.g., in the IP configuration phase, the AT 810 sends DHCPDISCOVER or DHCPREQUEST to the AGW 820 to request an IP address. If, according to the IP Service Authorized Attribute, PMIP is not authorized, but CMIP is authorized, the AGW 820 indicates to the AT 810 that PMIP is not authorized in one of several ways. For example, the AGW 820 may send a DHCPACK signal with no IP address included; the AGW 820 may send a DHCPNACK signal; or the AGW 820 may discard any DHCP packets, resulting in a DHCP Timeout at the AT 810 as it waits in vain for an acknowledgment of the DHCP packets.
Option 3

In another example, the authorization of IP services may be accomplished at an intermediate period between or including the authentication phase and the IP address assignment phase of the establishment of a PPP connection. According to this example, as illustrated by the call flow diagram of FIG. 9, during the LCP configuration phase, the AT 910 utilizes PPP vendor specific packets to indicate to the AGW 920 which IP services the AT 910 is capable of, to indicate a mobility preference, and further to indicate that the AT 910 supports IP service authorization. That is, 3GPP2 X.S0011-D includes a Version/Capability Indication Packet (VCIP) that may be utilized by the AT 910 to communicate this information to the AGW 920 during the LCP negotiation phase. Alternatively, a vendor-specific PPP option may be utilized, instead of the VCIP packet, to indicate this information to the AGW 920 during the LCP negotiation phase. This utilization of additional information during the LCP negotiation phase maintains compatibility between an AGW 920 according to this example and a legacy AT that lacks IP service authorization capabilities. That is, if the additional information is lacking from information sent by a legacy AT, the AGW may handle the allocation of IP services differently.

After the establishment of the data link, in this example, the authentication phase is initiated utilizing simple IP signaling (e.g., by utilizing PAP, CHAP, or EAP). During the authentication phase, the AAA server 930 in the AT 910 home network sends an IP Service Authorized Parameter to the AGW indicating which IP services that AT is authorized for.

After authentication successfully completes, the AGW 920 may send an IP service authorization indication 980 (e.g., a PPP vendor specific packet) back to the AT 910. The AT 910 may wait to enter the IP configuration phase until it receives this indication 980. After receiving the IP service authorization indication 980, the AT 910 may send an acknowledgment signal ACK 990 to acknowledge that it has received the IP service authorization indication 980. At this point, the AT has been informed which IP services it is authorized for, so it only attempts IP configuration utilizing one of those authorized IP services. For example, if the AT prefers mobility, but it is not authorized for PMIP, it may initiate IP configuration utilizing CMIP signaling.

Option 4

In another example, the authorization of IP services is accomplished during or after mobile IPv4 registration. According to this example, as illustrated in the call flow diagram of FIG. 10, during the LCP configuration phase, the AT 1010 may utilize vendor specific packets to indicate to the AGW 1011 that the AT 1010 supports IP service authorization and null PPP authentication (to be described below). This indication may be accomplished by utilizing the Version/Capability Indication Packet VCIP in X.S0011, or by utilizing a PPP vendor-specific option during LCP configuration 1014 between the AT 1010 to the AGW 1011.

Because in legacy systems the AT generally does not negotiate the authentication option, as per the X.S0011-D in the case of Mobile IPv4, a null PPP authentication 1015 may be performed followed by an IPCP configuration request signal without an address option (i.e., a null IP address) 1016. This step is utilized in order to maintain compatibility between a new AT, capable of IP service selection, and a legacy AGW without this capability. That is, the null IPCP 1016 is performed to advance the state machine of a legacy AGW into the next step.

The AT 1010 next may send a CMIP RRQ signal 1017 to initiate the authentication phase utilizing CMIP signaling. This RRQ signal 1017 may then trigger the sending of an Access Request signal 1018 from the AGW 1011 to the AAA 1012 in the home network of the AT 1010. The AAA 1012 may respond with an Access Accept message 1019 including the IP Service Authorized Attribute to the AGW 1011.

The AGW 1011 then may send IP service authorization information 1020 to the AT 1010 utilizing the PPP vendor specific packet, and the AT 1010 may send an acknowledgment back to the AGW 1011, for example, with a signal ACK 1021.

Figure 10:
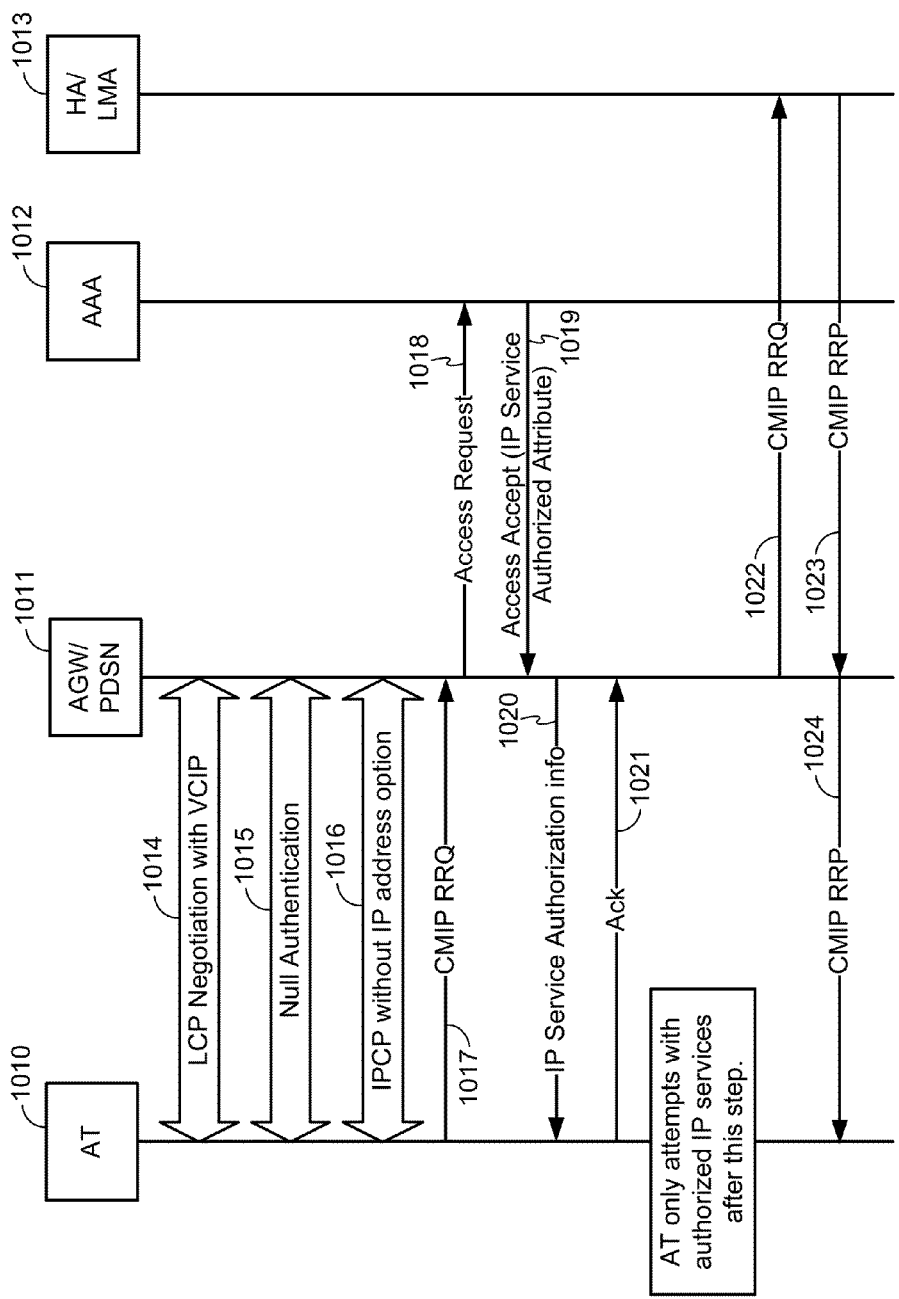
FIG. 10 is a call flow diagram illustrating an exemplary configuration where IP services authorization is accomplished during or after mobile IPv4 registration.

At this point, the AT 1010 has been informed which IP services it is authorized for, so it only attempts IP configuration utilizing one of those authorized IP services. For example, if the AT 1010 prefers mobility, but it is not authorized for PMIP, it will initiate IP configuration utilizing CMIP signaling. As illustrated in FIG. 10, the network provides the AT 1010 with IP service over the CMIP protocol by way of the RRQ and RRP signals 1022, 1023, and 1024.

According to this example, if CMIP were not authorized, or if the AT 1010 would prefer PMIP over CMIP, the AT may be required to re-start the authentication phase utilizing simple IP signaling, because the authorization accomplished utilizing CMIP signaling may not be usable for a simple IP or PMIP connection.

Option 5

In another example, option 2, disclosed above, may be utilized if an AT requests an unauthorized IP service (according to the IP Service Authorized Parameter), or if some ATs that do not support option 1 coexist with "new" ATs that support option 2 in the network. Otherwise, according to this example, option 1, disclosed above, may be utilized.

Option 6

In another example, option 2, disclosed above, may be utilized if an AT requests an unauthorized IP service (according to the IP Service Authorized Parameter), or if some ATs that do not support option 3 coexist with "new" ATs that support option 3 in the network. Otherwise, according to this example, option 3, disclosed above, may be utilized.

Option 7

In another example, an explicit negotiation of the mobility protocol and/or authorized IP service occurs during the IP address assignment phase. According to this example, a vendor specific option (VSO) is introduced within the IPCP/VSNCP configure message to communicate IP mobility during the NCP negotiation phase. The AGW may respond to the request for mobility by indicating services for which the AT is authorized, in correspondence with the information from the AAA in the IP Service Authorized Attribute. That is, as an example, the AGW sets the value of an IP Mobility VSO to be sent to the AT, to one of the following values:

Simple IP (no mobility);

PMIP (local mobility—services that are offered at the location of the AT are available);

PMIP (home mobility—the same services as are available on the AT's home network are available); or CMIP (mobility).

FIGS. 11-14 are call flow diagrams that illustrate four of the potential scenarios within this example. In each of these diagrams, LCP negotiation and access authentication are executed as above, utilizing simple IP signaling, resulting in a AAA server 1112 sending an IP Service Authorized Attribute indicating which IP services the AT 1110 is authorized for, to the AGW 1111. While this signaling is only illustrated in FIG. 11 for this example, it is understood that this signaling may be the same in each of FIGS. 12-14, that is, the AGW has received an IP Service Authorized Attribute from a AAA.

Figure 11:
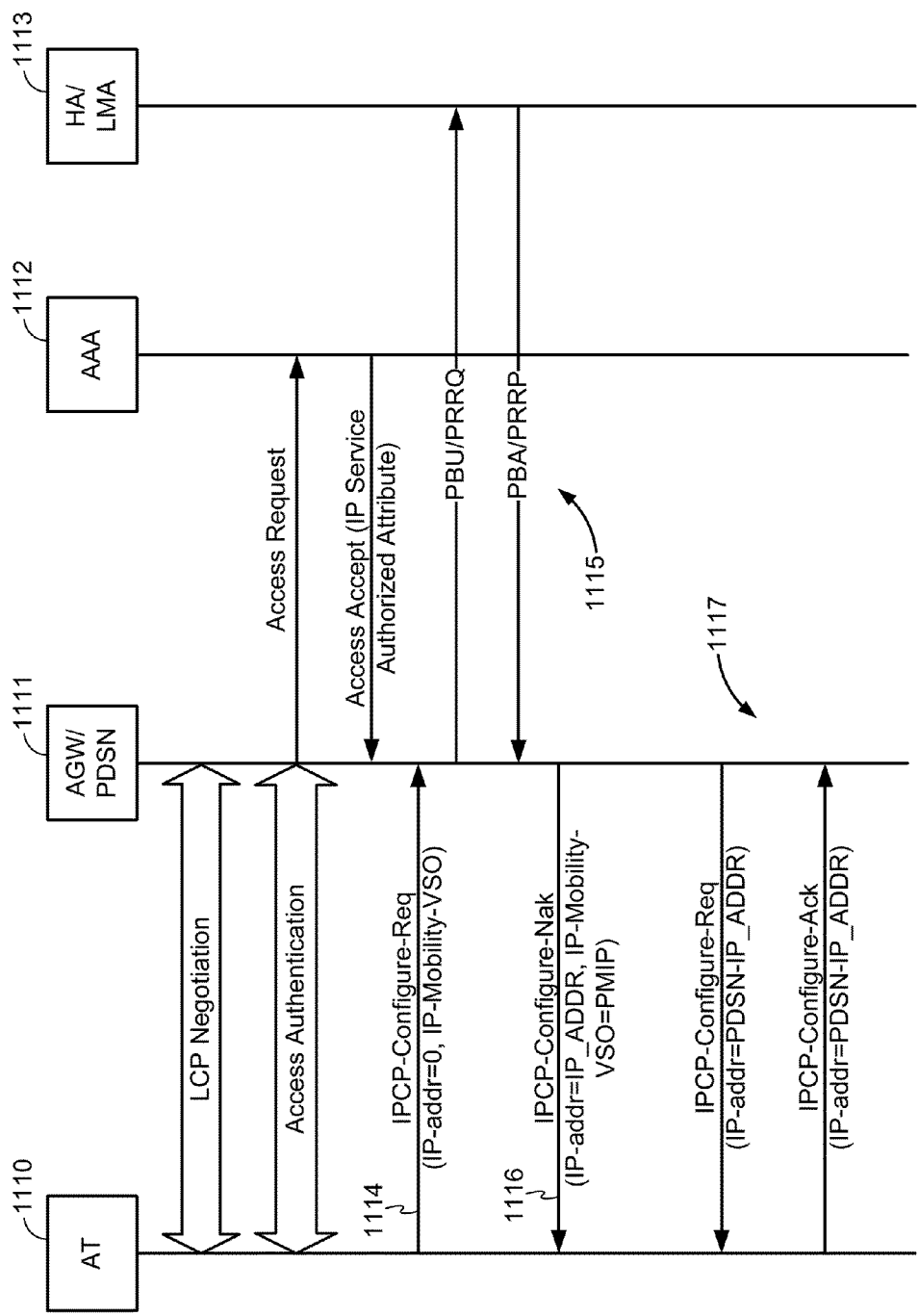
FIGS. 11-14 are call flow diagrams illustrating exemplary configurations where IP services authorization is accomplished with an explicit negotiation of the mobility protocol and/or authorized IP service during the IP address assignment phase.

In a first case, illustrated in FIG. 11, the AT 1110 desires to have mobility. Thus, during IP configuration, the AT 1110 sends an IPCP configuration request signal 1114 including a vendor specific option VSO within the configure message to indicate the preference for mobility. In this illustration, the AT 1110 is authorized for PMIP, so the network initiates signaling 1115 for binding the AT 1110 to a local mobility anchor LMA 1113. The AGW 1111 explicitly acknowledges the VSO and replies that PMIP is granted in signaling 1116 to the AT 1110. Thus, the AT moves forward utilizing simple IP signaling 1117 with assurance that it will have mobility.

Figure 12:
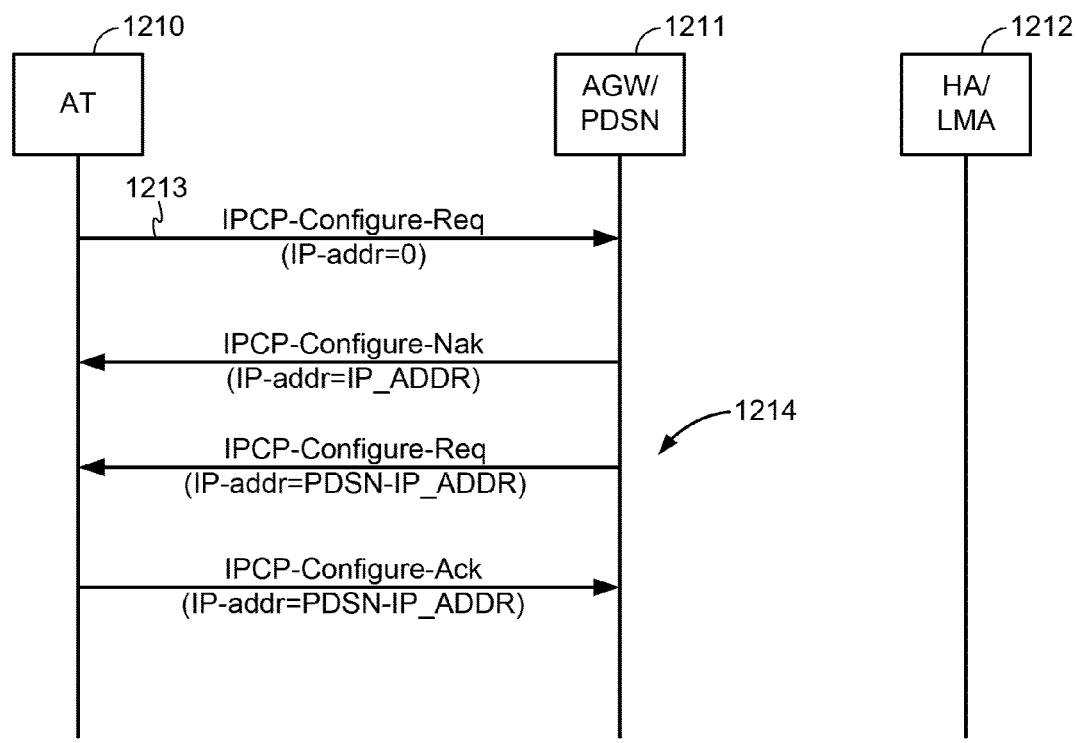

In a second case, illustrated in FIG. 12, the AT 1210 does not request mobility. Thus, during IP configuration, the AT 1210 sends an IPCP configuration request signal 1213 that does not include the vendor specific option (VSO). The AGW 1211 recognizes this as indicating that the AT 1210 does not require mobility, and thus, provides the AT 1210 with a simple IP address and continues with simple IP signaling 1214.

Figure 13:
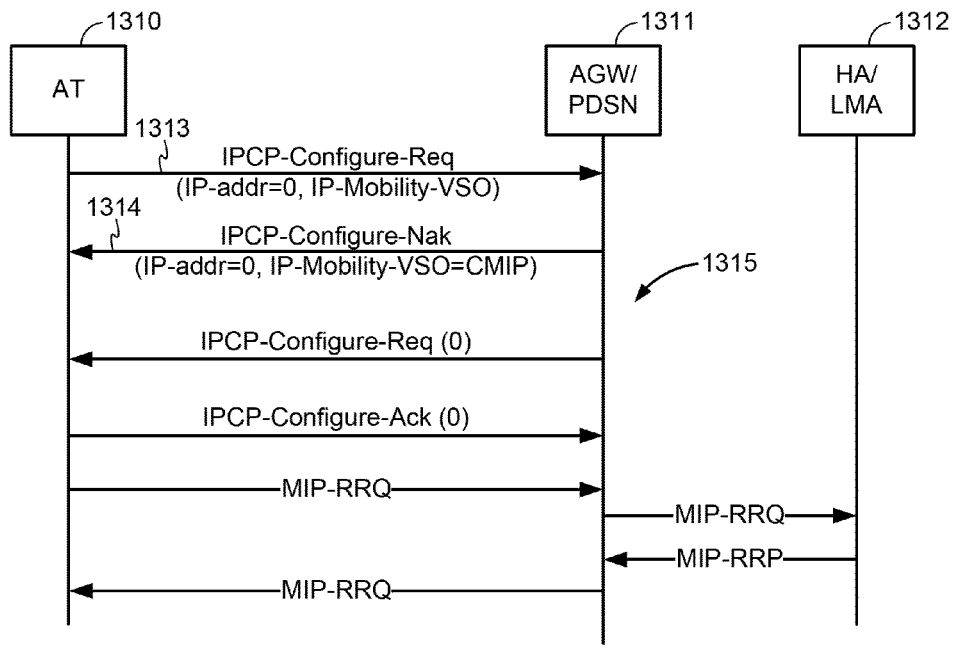

In a third case, illustrated in FIG. 13, an AT 1310 requests mobility with an IP Mobility VSO, and, although PMIP is not authorized, CMIP is authorized, so the network grants CMIP. That is, the AT 1310 sends an IPCP configuration request signal 1313 including a vendor specific option VSO indicating the preference for mobility. The AGW 1311 responds with a VSO message 1314 indicating that CMIP is authorized. Thereafter, the system in this case continues with CMIP signaling 1315 without re-doing authentication, and re-using the authentication that has already been performed.

Figure 14:
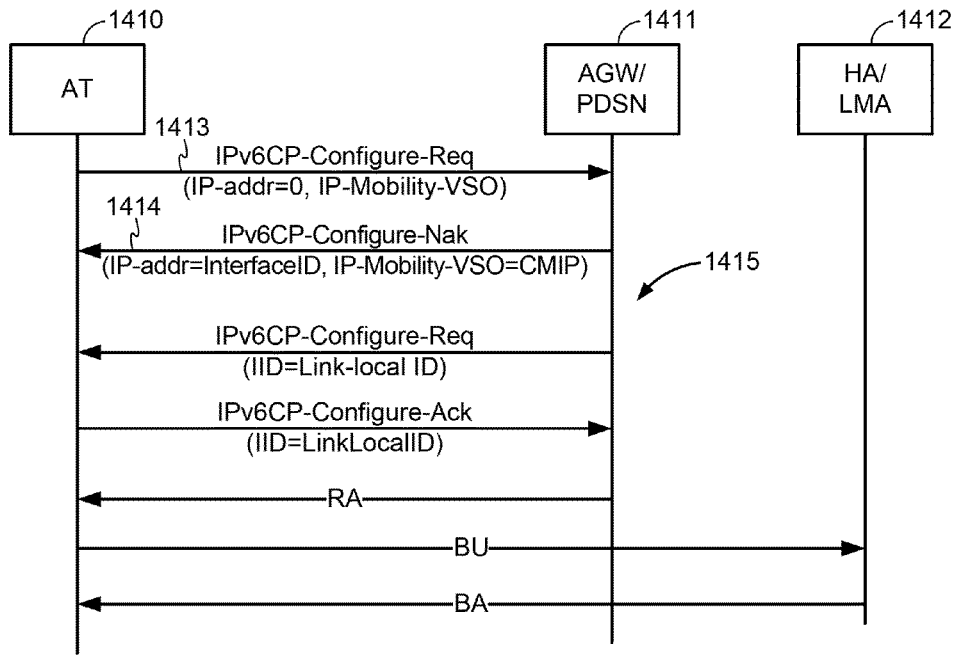

A fourth case, illustrated in FIG. 14, is similar to the case illustrated in FIG. 13, however the AT 1410 communicates utilizing IPv6 signaling. Here, an AT 1410 requests mobility with an IP Mobility VSO, and, although PMIP is not authorized, CMIPv6 is authorized, so the network grants CMIPv6. That is, the AGW 1411 responds with a VSO message 1414 indicating that CMIPv6 is authorized. Thereafter, the system in this case continues with CMIPv6 signaling 1415.

Option 8

In another example, an implicit indication of a mobility protocol may be provided by utilizing a modified IP configuration phase within CMIP signaling. In this example, an AT indicating a preference for mobility may obtain the best available mobility option. That is, an optimized fallback to a less preferred IP service with mobility is enabled. Further, according to this example, based on the implicit indication of the mobility preference, an AT configured to utilize this example is compatible with legacy networks, and a network configured to utilize this example is compatible with legacy ATs.

Figure 15:
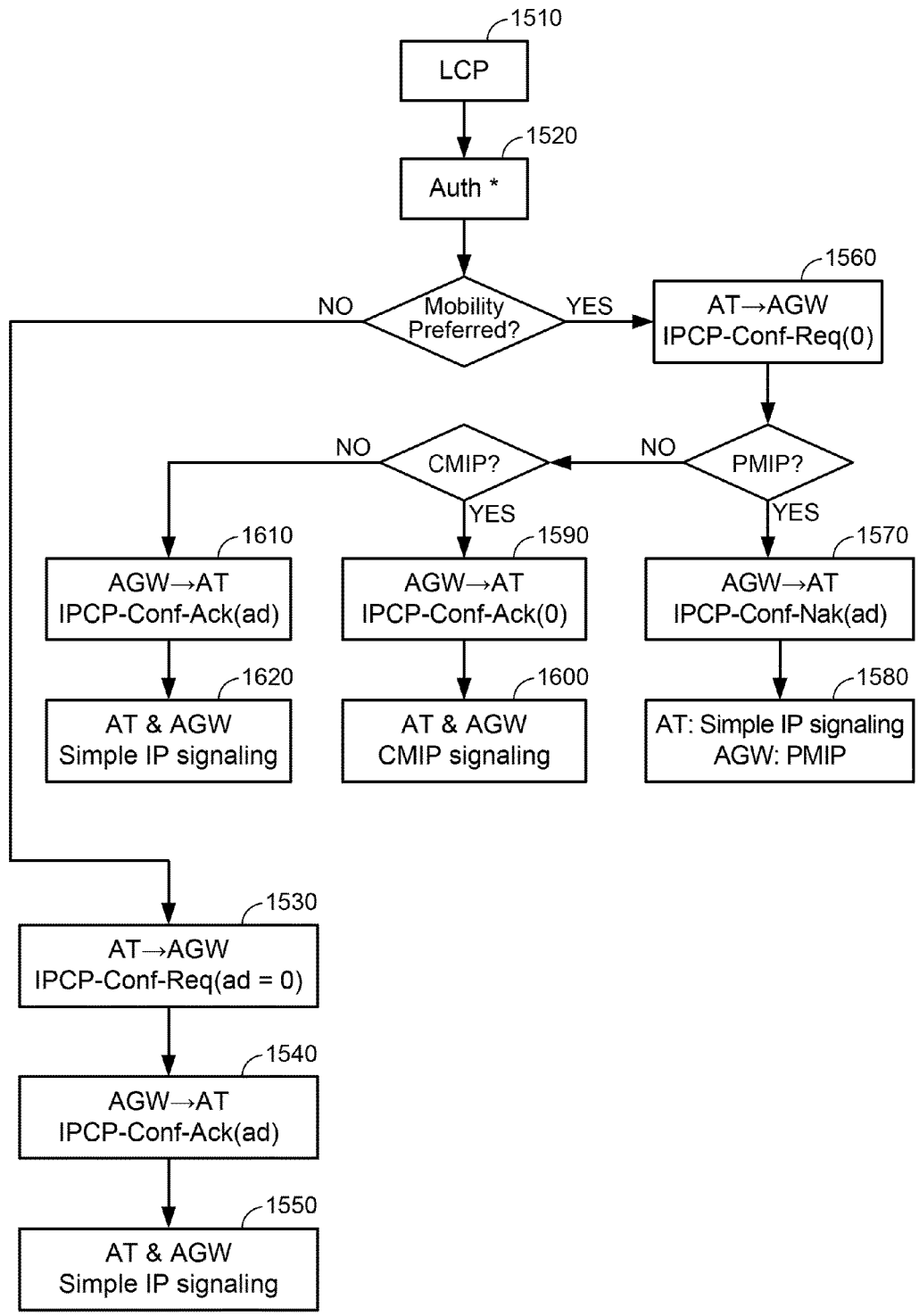
FIG. 15 is a flow chart illustrating an exemplary configuration where IP services authorization is accomplished utilizing a modified IP configuration phase within CMIP signaling.

FIG. 15 is a flow chart illustrating a process according to this example, including an implicit indication of a mobility protocol with a fallback to a less preferred mobility option. Referring to FIG. 15, in block 1510, LCP negotiation is performed, and in block 1520, access authentication is performed utilizing CMIP signaling. The access authentication 1520 may be any suitable authentication protocol, including PAP, CHAP, or EAP. During the authentication phase 1520, the AGW receives an IP Service Authorized Parameter from an AAA in the home network of the AT, indicating which IP services that AT is authorized for.

If the AT has no preference for mobility, the process branches to block 1530, wherein the AT implicitly indicates that it does not have a preference for mobility by transmitting IPCP-Config-Req(ad=0). The AGW responds at block 1540 with IPCP-Config-Ack(ad) to acknowledge that the system will proceed with simple IP signaling, and in block 1550, the process continues the network-layer communication utilizing simple IP signaling, wherein the AT utilizes the IP address forwarded by the AGW in block 1540.

On the other hand, if the AT preferred mobility, the process branches to block 1560, wherein the AT implicitly indicates this preference by sending an IPCP Configure Request message with no address option included in the message. If PMIP is authorized in accordance with the IP Service Authorized Parameter, the AGW responds in block 1570 with an IPCP Configure Non-acknowledgment message including an address option with the address option set to the assigned IP address, to implicitly indicate that PMIP is authorized. Thereafter, as indicated in block 1580, the AT continues with Simple IP signaling utilizing the IP address sent by the AGW, with assurance that it has been granted PMIP mobility.

If, in accordance with the IP Service Authorized Parameter, PMIP were not authorized but CMIP were authorized, the process may branch to block 1590. In block 1590, the AGW responds to the configuration request from the AT with an IPCP Configure Acknowledgment message with no address option, to implicitly indicate to the AT that CMIP is authorized. The AT understands this signal as an implicit indication that PMIP is not authorized, but CMIP is authorized, so in block 1600, the process continues with the system utilizing CMIP signaling.

If, in accordance with the IP Service Authorized Parameter, mobility of any kind is not authorized for the AT, the process branches to block 1610, wherein the AGW responds to the configuration request from the AT with an IPCP Configure Acknowledgment providing a simple IP address. The AT understands this signal as an implicit indication that mobility is not authorized, so in block 1620, the process continues, with the system utilizing simple IP signaling. Finally, when Simple IP is also not assigned, then the AGW may respond with a Protocol Reject message.

Figure 16:
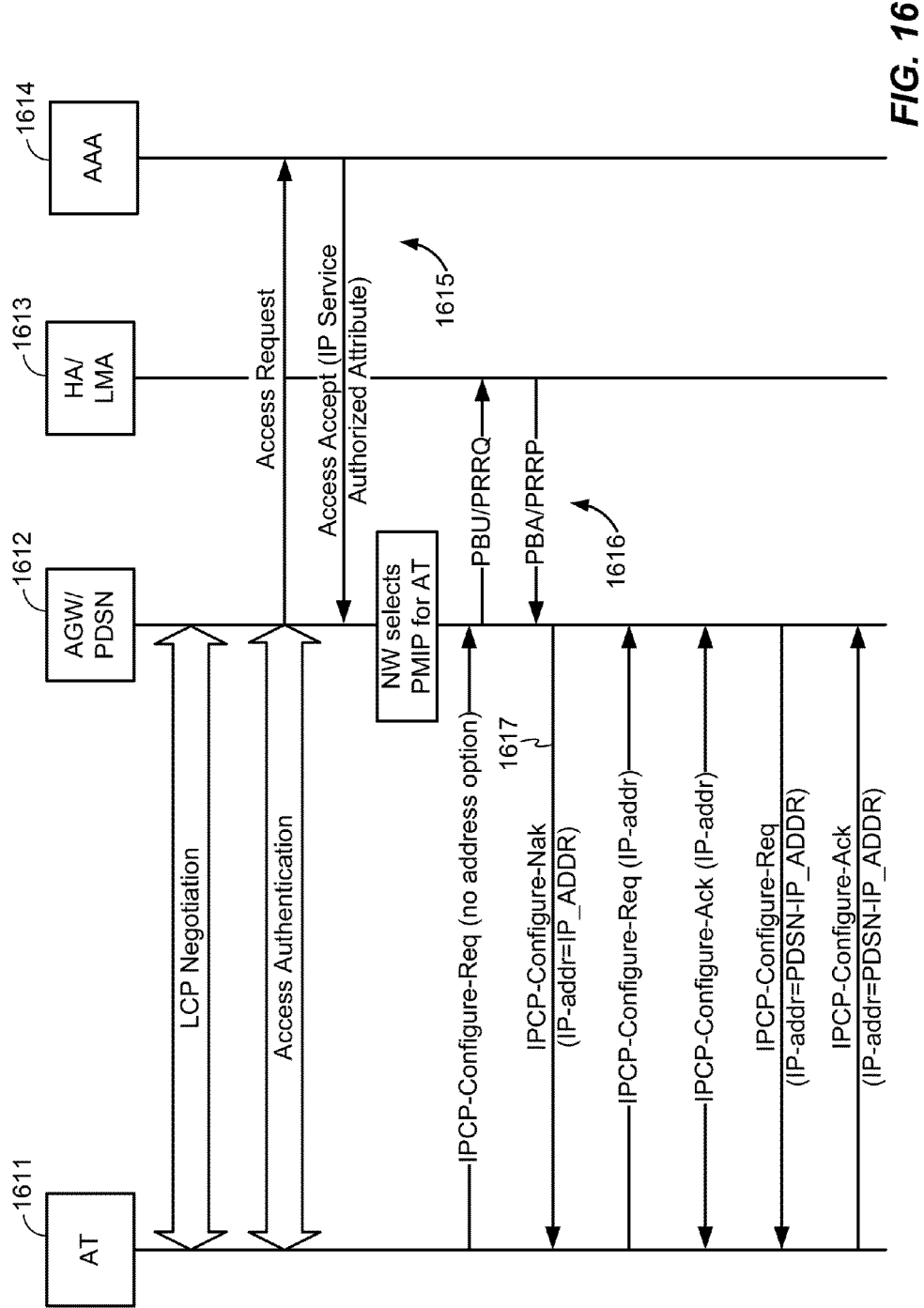
FIGS. 16 and 17 are call flow diagrams illustrating two exemplary scenarios that may occur with the configuration illustrated by FIG. 15.
Figure 17:
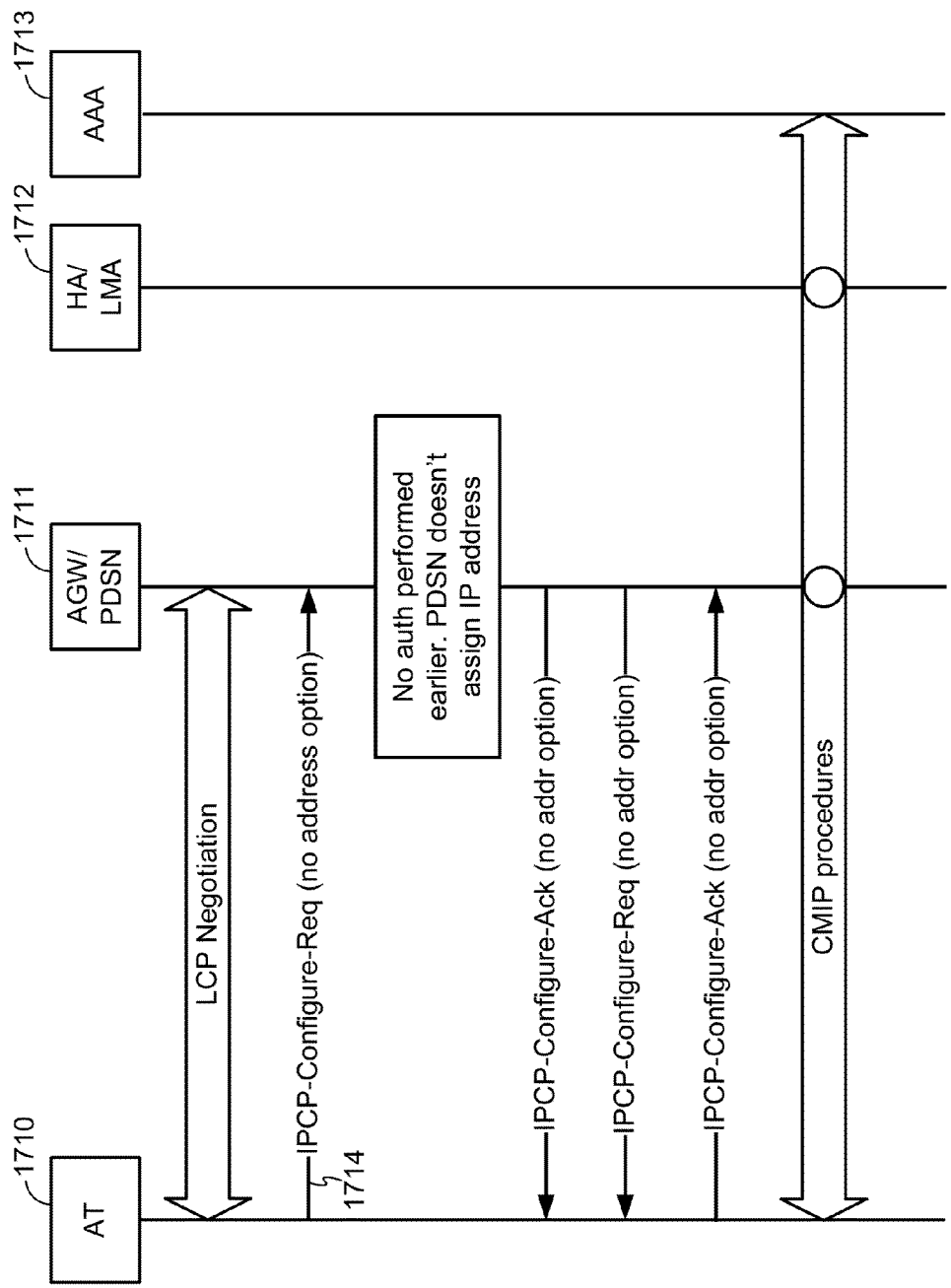

FIGS. 16 and 17 are call flow diagrams illustrating two exemplary scenarios that may occur within this example. Referring now to FIG. 16, a scenario is illustrated in which an AT 1611 requests mobility, and is granted PMIP mobility. According to this example, LCP negotiation and access authentication (e.g., PAP/CHAP/EAP) are performed utilizing CMIP signaling, wherein an IP Service Authorized Parameter 1615 is communicated from the AAA server 1614 in the home network of the AT 1611 to the AGW 1612.

During IP configuration (as indicated above, CMIP signaling is utilized in this example), the AT 1611 implicitly indicates its mobility preference to the AGW 1612. That is, when the AT 1611 prefers mobility, the AT 1611 initiates the CMIP-based IPCP procedure with no address option (i.e., by sending IPCP-Config-Req (0)). In a scenario in which the AT 1611 had no mobility preference, the AT 1611 may simply request a simple IP address (i.e., by sending IPCP-Config-Req (ad=0)). In this way, for compatibility with legacy network systems, substantially conventional signaling is utilized by the AT 1611, while the AGW 1612 according to this example understands the implicit indication of a mobility preference.

Returning now to FIG. 16, the AGW 1612, recognizing the implicit request for mobility, grants PMIP because the IP Service Authorized Attribute 1615 provided by the AAA 1614 indicates that PMIP is authorized. Thus, the AGW 1612 performs a binding operation 1616 with the LMA 1613 and implicitly notifies the AT 1611 that PMIP will be provided by sending an IPCP non-acknowledgment signal 1617 including an IP address. Thereafter, the network provides the AT 1611 with PMIP service.

If the AT 1611 requests mobility and PMIP is not authorized according to the IP Service Authorized Attribute 1615, but CMIP is authorized, in this example, the AGW 1612 falls back to the less-preferred option of CMIP. That is, while the AT 1611 would have preferred PMIP, according to this example the AT 1611 will prefer mobility with CMIP over no mobility at all (e.g., with a simple IP address). Thus, the AGW 1612 may send an IPCP configuration acknowledgment with no address option (i.e., the AGW 1612 may send IPCP-Config-Ack(0)) to implicitly indicate that CMIP is authorized. The AT 1611, recognizing this as an indication that CMIP is authorized, continues with CMIP signaling, achieving mobility in its less-preferred protocol.

In FIG. 17, a scenario is illustrated wherein a legacy AT 1710 (that is, a conventional AT not configured according to this example) initiates a CMIP connection with a network configured according to this example. Here, the network recognizes the incompatibility, and successfully grants CMIP mobility.

Following conventional CMIP procedures, after LCP Negotiation, the legacy AT 1710 proceeds with an IPCP Configuration Request 1714 utilizing CMIP signaling. Recall from FIGS. 15 and 16 that, as distinguished from conventional CMIP procedures, the AT configured according to this example would initiate access authentication. However, here, this step was not performed. Thus, the AGW 1711 recognizes that it is communicating with a legacy AT 1710, and does not assign an IP address as it would have in response to the same signal coming from an AT configured according to this example. Rather, the AGW 1711 responds in the same way that a legacy network would have responded, thereafter establishing a CMIP connection.

Figure 20:
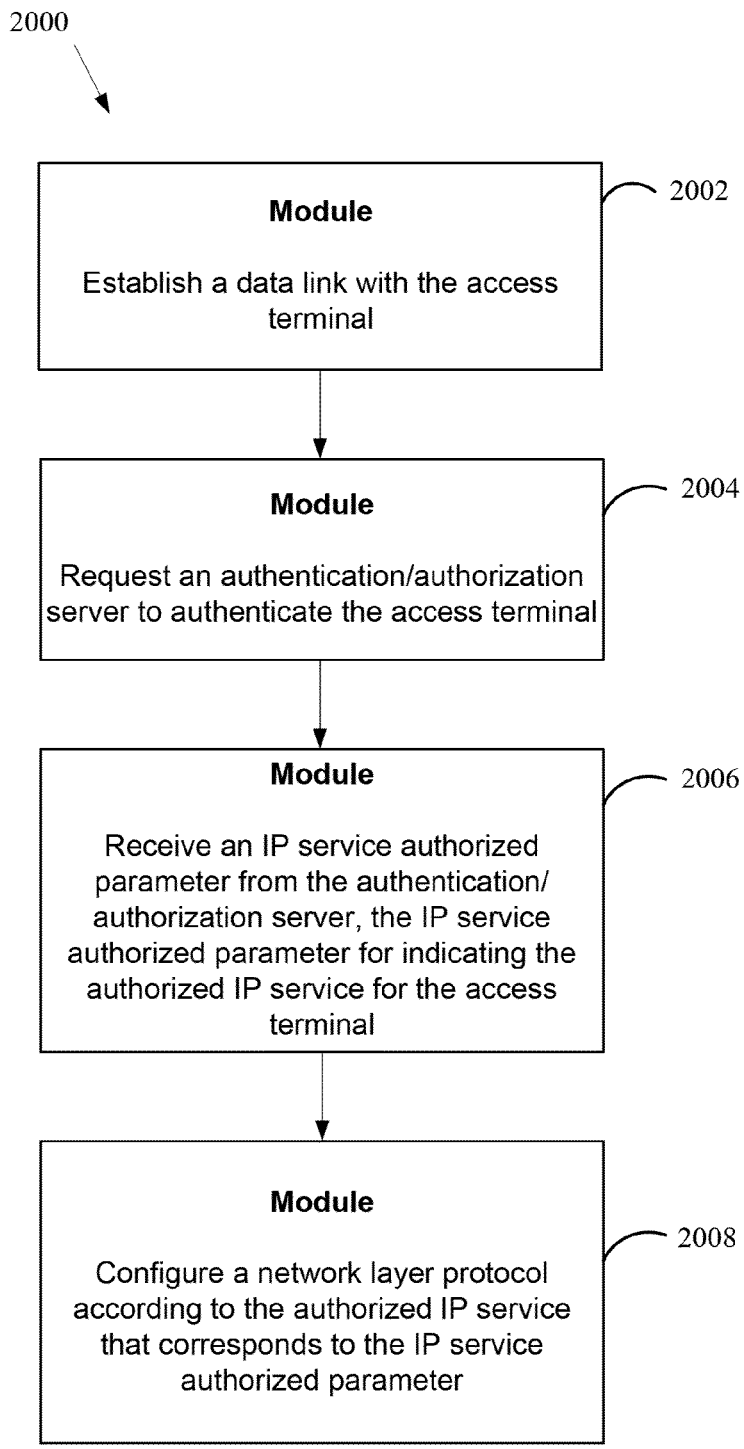
FIG. 20 is a conceptual block diagram illustrating the functionality of an exemplary apparatus.

FIG. 20 is a conceptual block diagram illustrating the functionality of an exemplary apparatus 2000. The apparatus 2000 includes a module 2002 that establishes a data link with the access terminal, a module 2004 that requests an authentication/authorization server to authenticate the access terminal, a module 2006 that receives an IP service authorized parameter from the authentication/authorization server, the IP service authorized parameter for indicating the authorized IP service for the access terminal, and a module 2008 that configures a network layer protocol according to the authorized IP service that corresponds to the IP service authorized parameter.

In one configuration, the apparatus 2000 for wireless communication includes means for establishing a data link with the access terminal. In addition, the apparatus 2000 includes means for requesting an authentication/authorization server to authenticate the access terminal. In addition, the apparatus 2000 includes means for receiving an IP service authorized parameter from the authentication/authorization server, the IP service authorized parameter for indicating the authorized IP service for the access terminal In addition, the apparatus 2000 includes means for configuring a network layer protocol according to the authorized IP service that corresponds to the IP service authorized parameter. The aforementioned means is the processing system 1800 configured to perform the functions recited by the aforementioned means. As described supra, the processing system 1800 may include the access gateway 1904. As such, in one configuration, the aforementioned means may be the access gateway configured to perform the functions recited by the aforementioned means.

Figure 21:
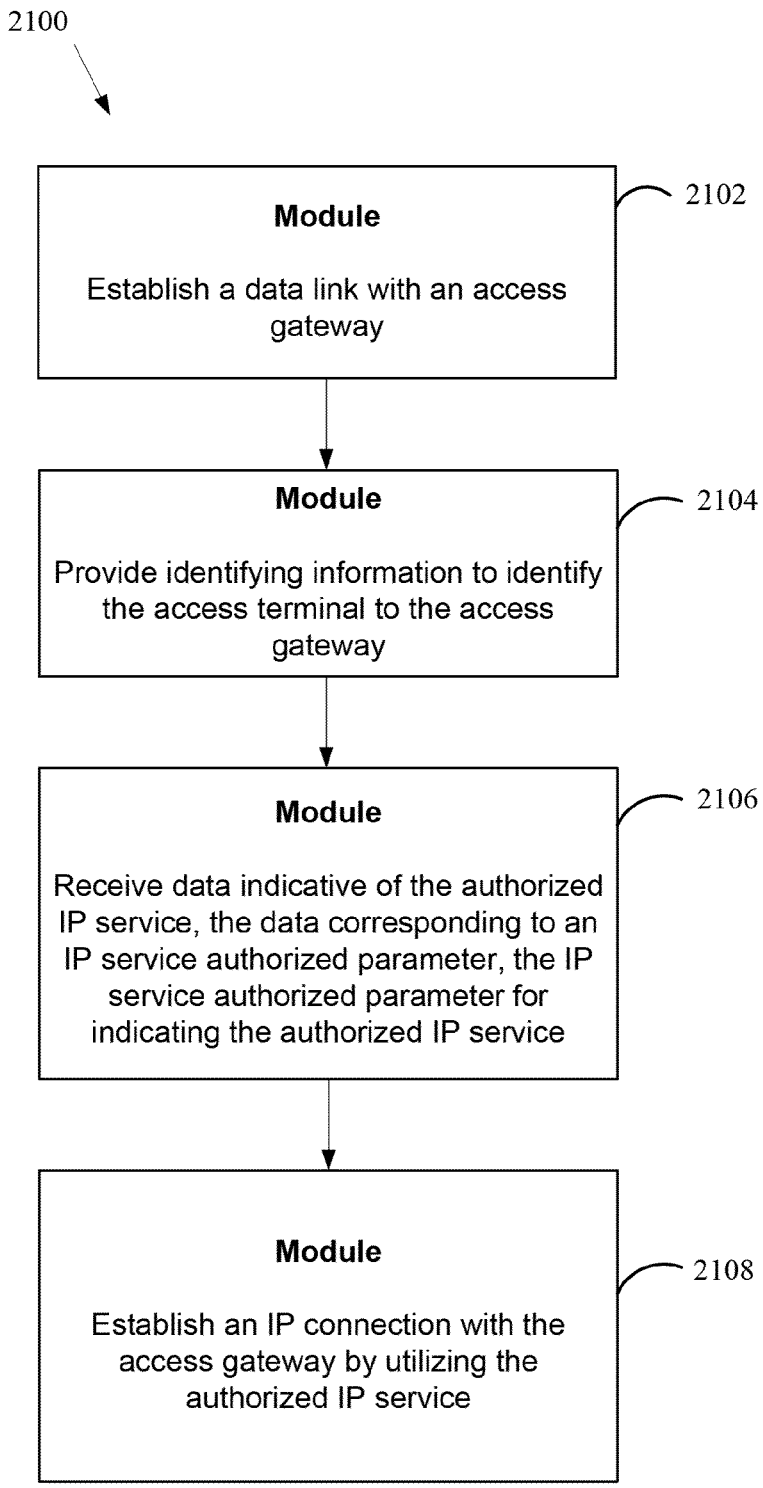
FIG. 21 is a conceptual block diagram illustrating the functionality of an exemplary apparatus.

FIG. 21 is a conceptual block diagram illustrating the functionality of an exemplary apparatus 2100. The apparatus 2100 includes a module 2102 that establishes a data link with the access gateway, a module 2104 that provides identifying information to identify the access terminal to the access gateway, a module 2106 that receives data indicative of the authorized IP service, the data corresponding to an IP service authorized parameter, the IP service authorized parameter for indicating the authorized IP service, and a module 2108 that establishes an IP connection with the access gateway by utilizing the authorized IP service.

In one configuration, the apparatus 2100 for wireless communication includes means for establishing a data link with the access gateway. In addition, the apparatus 2100 includes means for providing identifying information to identify the access terminal to the access gateway. In addition, the apparatus 2000 includes means for receiving data indicative of the authorized IP service, the data corresponding to an IP service authorized parameter, where the IP service authorized parameter is for indicating the authorized IP service. In addition, the apparatus 2000 includes means for establishing an IP connection with the access gateway by utilizing the authorized IP service. The aforementioned means is the processing system 1800 configured to perform the functions recited by the aforementioned means. As described supra, the processing system 1800 may include the access terminal 1906. As such, in one configuration, the aforementioned means may be the access terminal configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for determining an authorized IP service for an access terminal during an establishment of a PPP connection, comprising:
    establishing a data link with the access terminal;
    requesting an authentication/authorization server to authenticate the access terminal;
    receiving an IP Service Authorized Parameter from the authentication/authorization server, the IP Service Authorized Parameter for indicating the authorized IP service for the access terminal;
    configuring a network layer protocol according to the authorized IP service that corresponds to the IP Service Authorized Parameter and satisfies an IP service preference indication received from the authentication/authorization server on behalf of the access terminal; and
    configuring a mobility protocol according to the authorized IP service that corresponds to the IP Service Authorized Parameter and satisfies the IP service preference indication received from the authentication/authorization server on behalf of the access terminal.

2. The method of claim 1, further comprising communicating the authorized IP service to the access terminal.

3. The method of claim 1, wherein the authorized IP service comprises at least one of:
    Internet protocol version 4 (IPv4);
    Internet protocol version 6 (IPv6);
    client mobile Internet protocol version 4 (CMIPv4);
    client mobile Internet protocol version 6 (CMIPv6);
    IPv4 with proxy mobile Internet protocol version 4 (PMIPv4);
    IPv4 with proxy mobile Internet protocol version 6 (PMIPv6);
    IPv6 with PMIPv4; or
    IPv6 with PMIPv6,
    wherein IPv4 and IPv6 are simple IP services; CMIPv4 and CMIPv6 are CMIP services; and PMIPv4 and PMIPv6 are PMIP services.

4. The method of claim 3, wherein an authorization of each of the IP services corresponds to a respective bit of the IP Service Authorized Parameter.

5. The method of claim 1, further comprising:
    communicating the authorized IP service to the access terminal during an authentication phase of the establishing of the PPP connection;
    entering an IP configuration phase of the establishing of the PPP connection utilizing simple IP signaling in response to the IP Service Authorized Parameter indicating that PMIP service is authorized; and
    entering a second authentication phase utilizing CMIP signaling when the IP Service Authorized Parameter indicates that PMIP service is not authorized.

6. The method of claim 5, further comprising:
determining that the access terminal has requested an unauthorized IP service, or that the access terminal does not support IP service authorization during the authentication phase;
entering an IP configuration phase of the establishing of the PPP connection utilizing simple IP signaling; and
rejecting an IP configuration request from the access terminal and entering a second authentication phase utilizing CMIP signaling when the IP Service Authorized Parameter indicates that PMIP service is not authorized.

7. The method of claim 1, further comprising:
entering an IP configuration phase of the establishing of the PPP connection utilizing simple IP signaling; and
rejecting an IP configuration request from the access terminal and entering a second authentication phase utilizing CMIP signaling when the IP Service Authorized Parameter indicates that PMIP service is not authorized.

8. The method of claim 1, further comprising:
receiving information from the access terminal during the establishing of the data link with the access terminal, the information from the access terminal indicating that the access terminal supports IP service authorization;
sending an IP service authorization information packet to the access terminal after the receiving of the IP Service Authorized Parameter from the server, the IP service authorization information packet indicating which IP service the access terminal is authorized for; and
receiving an acknowledgment from the access terminal to acknowledge the IP service authorization information packet.

9. The method of claim 8, further comprising:
determining that the access terminal has requested an unauthorized IP service, or that the access terminal does not support IP service authorization during the authentication phase;
entering an IP configuration phase of the establishing of the PPP connection utilizing simple IP signaling; and
rejecting an IP configuration request from the access terminal and entering a second authentication phase utilizing CMIP signaling when the IP Service Authorized Parameter indicates that PMIP service is not authorized.

10. The method of claim 1, wherein the establishing of the data link comprises receiving a packet from the access terminal indicating that the access terminal supports IP service authorization, the method further comprising:
performing a null PPP authentication;
executing a network layer configuration without an IP address option;
executing a CMIP authentication, wherein the IP Service Authorized Parameter is received from the authentication/authorization server;
communicating the authorized IP service to the access terminal; and
receiving an acknowledgment of the authorized IP service from the access terminal.

11. The method of claim 1, wherein the IP service preference indication explicitly indicates the preferred IP service, and further comprising:
during the configuring of the network layer protocol:
receiving from the access terminal a parameter explicitly indicating the preferred IP service; and
granting an IP service corresponding to the preferred IP service when the preferred IP service corresponds to an authorized IP service as indicated by the IP Service Authorized Parameter.

12. The method of claim 1, wherein the IP service preference indication implicitly identifies the preferred IP service, and the configuring of the network layer protocol comprises performing a CMIP-based IPCP, the method further comprising:
receiving an indication from the access terminal implicitly identifying the preferred IP service; and
granting PMIP service to the access terminal when the preferred IP service corresponds to a preference for mobility and the IP Service Authorized Parameter indicates PMIP service is authorized.

13. The method of claim 12, further comprising granting CMIP service to the access terminal when the preferred IP service corresponds to the preference for mobility and the IP Service Authorized Parameter indicates PMIP service is not authorized.

14. The method of claim 12, wherein the IP service preference indication comprises:
a CMIP-based network-layer protocol configuration request including no address option when the IP service preference indication corresponds to a preference for mobility; and
a CMIP-based network-layer protocol configuration request including an address option when the IP service preference indication corresponds to no preference for mobility.

15. The method of claim 14, further comprising:
sending an IPCP non-acknowledgment signal including an address option to the access terminal and granting PMIP service to the access terminal when the IP service preference indication corresponds to a preference for mobility and the IP Service Authorized Parameter indicates that PMIP is authorized; and
sending an acknowledgment signal including no address option and granting CMIP service to the access terminal when the IP service preference indication corresponds to a preference for mobility and the IP Service Authorized Parameter indicates that PMIP is not authorized.

16. A processing system configured to determine an authorized IP service for an access terminal during an establishment of a PPP connection, comprising:
a first module configured to establish a data link with the access terminal;
a second module configured to request an authentication/authorization server to authenticate the access terminal;
a third module configured to receive an IP Service Authorized Parameter from the authentication/authorization server, the IP Service Authorized Parameter for indicating the authorized IP service for the access terminal; and
a fourth module configured to configure a network layer protocol according to the authorized IP service that corresponds to the IP Service Authorized Parameter and satisfies an IP service preference indication received from the authentication/authorization server on behalf of the access terminal; and
a fifth module configured to configure a mobility protocol according to the authorized IP service that corresponds to the IP Service Authorized Parameter and satisfies the IP service preference indication received from the authentication/authorization server on behalf of the access terminal.

17. The processing system of claim 16, further comprising a fifth module configured to communicate the authorized IP service to the access terminal.

18. The processing system of claim 16, wherein the authorized IP service comprises at least one of:
Internet protocol version 4 (IPv4);
Internet protocol version 6 (IPv6);
client mobile Internet protocol version 4 (CMIPv4);
client mobile Internet protocol version 6 (CMIPv6);
IPv4 with proxy mobile Internet protocol version 4 (PMIPv4);
IPv4 with proxy mobile Internet protocol version 6 (PMIPv6);
IPv6 with PMIPv4; or
IPv6 with PMIPv6,
wherein IPv4 and IPv6 are simple IP services; CMIPv4 and CMIPv6 are CMIP services; and PMIPv4 and PMIPv6 are PMIP services.

19. The processing system of claim 18, wherein an authorization of each of the IP services corresponds to a respective bit of the IP Service Authorized Parameter.

20. The processing system of claim 16, further comprising:
a sixth module configured to communicate the authorized IP service to the access terminal during an authentication phase of the establishing of the PPP connection;
a seventh module configured to enter an IP configuration phase of the establishing of the PPP connection utilizing simple IP signaling in response to the IP Service Authorized Parameter indicating that PMIP service is authorized; and
an eighth module configured to enter a second authentication phase utilizing CMIP signaling when the IP Service Authorized Parameter indicates that PMIP service is not authorized.

21. The processing system of claim 20, further comprising:
a ninth module configured to determine that the access terminal has requested an unauthorized IP service, or that the access terminal does not support IP service authorization during the authentication phase;
a tenth module configured to enter an IP configuration phase of the establishing of the PPP connection utilizing simple IP signaling; and
an eleventh module configured to reject an IP configuration request from the access terminal and entering a second authentication phase utilizing CMIP signaling when the IP Service Authorized Parameter indicates that PMIP service is not authorized.

22. The processing system of claim 16, further comprising:
a sixth module configured to enter an IP configuration phase of the establishing of the PPP connection utilizing simple IP signaling; and
a seventh module configured to reject an IP configuration request from the access terminal and entering a second authentication phase utilizing CMIP signaling when the IP Service Authorized Parameter indicates that PMIP service is not authorized.

23. The processing system of claim 16, further comprising:
a sixth module configured to receive information from the access terminal during the establishing of the data link with the access terminal, the information from the access terminal indicating that the access terminal supports IP service authorization;
a seventh module configured to send an IP service authorization information packet to the access terminal after the receiving of the IP Service Authorized Parameter from the server, the IP service authorization information packet indicating which IP service the access terminal is authorized for; and
an eighth module configured to receive an acknowledgment from the access terminal to acknowledge the IP service authorization information packet.

24. The processing system of claim 23, further comprising:
a ninth module configured to determine that the access terminal has requested an unauthorized IP service, or that the access terminal does not support IP service authorization during the authentication phase;
a tenth module configured to enter an IP configuration phase of the establishing of the PPP connection utilizing simple IP signaling; and
an eleventh module configured to reject an IP configuration request from the access terminal and entering a second authentication phase utilizing CMIP signaling when the IP Service Authorized Parameter indicates that PMIP service is not authorized.

25. The processing system of claim 16, wherein the first module for establishing the data link comprises a sixth module configured to receive a packet from the access terminal indicating that the access terminal supports IP service authorization, the processing system further comprising:
a seventh module configured to perform a null PPP authentication;
an eighth module configured to execute a network layer configuration without an IP address option;
a ninth module configured to execute a CMIP authentication, wherein the IP Service Authorized Parameter is received from the authentication/authorization server;
a tenth module configured to communicate the authorized IP service to the access terminal; and
an eleventh module configured to receive an acknowledgment of the authorized IP service from the access terminal.

26. The processing system of claim 16, wherein the IP service preference indication explicitly indicates the preferred IP service, and the fourth module configured to configure the network layer protocol further comprises:
a sixth module configured to receive from the access terminal a parameter explicitly indicating the preferred IP service; and
a seventh module configured to grant an IP service corresponding to the preferred IP service when the preferred IP service corresponds to an authorized IP service as indicated by the IP Service Authorized Parameter.

27. The processing system of claim 16, wherein the IP service preference indication implicitly identifies the preferred IP service, and the fourth module configured to configure the network layer protocol further comprises a sixth module configured to perform a CMIP-based IPCP, the processing system further comprising:
a seventh module configured to receive an indication from the access terminal implicitly identifying the preferred IP service; and
an eighth module configured to grant PMIP service to the access terminal when the preferred IP service corresponds to a preference for mobility and the IP Service Authorized Parameter indicates PMIP service is authorized.

28. The processing system of claim 27, further comprising a ninth module configured to grant CMIP service to the access terminal when the preferred IP service corresponds to the preference for mobility and the IP Service Authorized Parameter indicates PMIP service is not authorized.

29. The processing system of claim 27, wherein the IP service preference indication comprises:

a CMIP-based network-layer protocol configuration request including no address option when the IP service preference indication corresponds to a preference for mobility; and a CMIP-based network-layer protocol configuration request including an address option when the IP service preference indication corresponds to no preference for mobility.

30. The processing system of claim 29, further comprising:

a tenth module configured to send an IPCP non-acknowledgment signal including an address option to the access terminal and granting PMIP service to the access terminal when the IP service preference indication corresponds to a preference for mobility and the IP Service Authorized Parameter indicates that PMIP is authorized; and an eleventh module configured to send an acknowledgment signal including no address option and granting CMIP service to the access terminal when the IP service preference indication corresponds to a preference for mobility and the IP Service Authorized Parameter indicates that PMIP is not authorized.

31. A computer program product, comprising:

a non-transitory computer-readable medium comprising code for:

establishing a data link with an access terminal;

requesting an authentication/authorization server to authenticate the access terminal;

receiving an IP Service Authorized Parameter from the authentication/authorization server, the IP Service Authorized Parameter for indicating the authorized IP service for the access terminal;

configuring a network layer protocol according to the authorized IP service that corresponds to the IP Service Authorized Parameter and satisfies an IP service preference indication received from the authentication/authorization server on behalf of the access terminal; and configuring a mobility protocol according to the authorized IP service that corresponds to the IP Service Authorized Parameter and satisfies the IP service preference indication received from the authentication/authorization server on behalf of the access terminal.

32. The computer program product of claim 31, further comprising code for communicating the authorized IP service to the access terminal.

33. The computer program product of claim 31, wherein the authorized IP service comprises at least one of:

Internet protocol version 4 (IPv4);
Internet protocol version 6 (IPv6);
client mobile Internet protocol version 4 (CMIPv4);
client mobile Internet protocol version 6 (CMIPv6);
IPv4 with proxy mobile Internet protocol version 4 (PMIPv4);
IPv4 with proxy mobile Internet protocol version 6 (PMIPv6);
IPv6 with PMIPv4; or
IPv6 with PMIPv6, wherein IPv4 and IPv6 are simple IP services; CMIPv4 and CMIPv6 are CMIP services; and PMIPv4 and PMIPv6 are PMIP services.

34. The computer program product of claim 33, wherein an authorization of each of the IP services corresponds to a respective bit of the IP Service Authorized Parameter.

35. The computer program product of claim 31, further comprising:

code for communicating the authorized IP service to the access terminal during an authentication phase of the establishing of the PPP connection;

code for entering an IP configuration phase of the establishing of the PPP connection utilizing simple IP signaling in response to the IP Service Authorized Parameter indicating that PMIP service is authorized; and code for entering a second authentication phase utilizing CMIP signaling when the IP Service Authorized Parameter indicates that PMIP service is not authorized.

36. The computer program product of claim 35, further comprising:

code for determining that the access terminal has requested an unauthorized IP service, or that the access terminal does not support IP service authorization during the authentication phase;

code for entering an IP configuration phase of the establishing of the PPP connection utilizing simple IP signaling; and code for rejecting an IP configuration request from the access terminal and entering a second authentication phase utilizing CMIP signaling when the IP Service Authorized Parameter indicates that PMIP service is not authorized.

37. The computer program product of claim 31, further comprising:

code for entering an IP configuration phase of the establishing of the PPP connection utilizing simple IP signaling; and code for rejecting an IP configuration request from the access terminal and entering a second authentication phase utilizing CMIP signaling when the IP Service Authorized Parameter indicates that PMIP service is not authorized.

38. The computer program product of claim 31, further comprising:

code for receiving information from the access terminal during the establishing of the data link with the access terminal, the information from the access terminal indicating that the access terminal supports IP service authorization;

code for sending an IP service authorization information packet to the access terminal after the receiving of the IP Service Authorized Parameter from the server, the IP service authorization information packet indicating which IP service the access terminal is authorized for; and code for receiving an acknowledgment from the access terminal to acknowledge the IP service authorization information packet.

39. The computer program product of claim 38, further comprising:

code for determining that the access terminal has requested an unauthorized IP service, or that the access terminal does not support IP service authorization during the authentication phase;

code for entering an IP configuration phase of the establishing of the PPP connection utilizing simple IP signaling; and code for rejecting an IP configuration request from the access terminal and entering a second authentication phase utilizing CMIP signaling when the IP Service Authorized Parameter indicates that PMIP service is not authorized.

40. The computer program product of claim 31, wherein the code for establishing the data link comprises code for receiving a packet from the access terminal indicating that the access terminal supports IP service authorization, the product further comprising:
  code for performing a null PPP authentication;
  code for executing a network layer configuration without an IP address option;
  code for executing a CMIP authentication, wherein the IP Service Authorized Parameter is received from the authentication/authorization server;
  code for communicating the authorized IP service to the access terminal; and
  code for receiving an acknowledgment of the authorized IP service from the access terminal.

41. The computer program product of claim 31, wherein the IP service preference indication explicitly indicates the preferred IP service, and the code for configuring the network layer protocol further comprises:
  code for receiving from the access terminal a parameter explicitly indicating the preferred IP service; and
  code for granting an IP service corresponding to the preferred IP service when the preferred IP service corresponds to an authorized IP service as indicated by the IP Service Authorized Parameter.

42. The computer program product of claim 31, wherein the IP service preference indication implicitly identifies the preferred IP service, and the code for configuring the network layer protocol comprises code for performing a CMIP-based IPCP, the product further comprising:
  code for receiving an indication from the access terminal implicitly identifying the preferred IP service; and
  code for granting PMIP service to the access terminal when the preferred IP service corresponds to a preference for mobility and the IP Service Authorized Parameter indicates PMIP service is authorized.

43. The computer program product of claim 42, further comprising code for granting CMIP service to the access terminal when the preferred IP service corresponds to the preference for mobility and the IP Service Authorized Parameter indicates PMIP service is not authorized.

44. The computer program product of claim 42, wherein the IP service preference indication comprises:
  a CMIP-based network-layer protocol configuration request including no address option when the IP service preference indication corresponds to a preference for mobility; and
  a CMIP-based network-layer protocol configuration request including an address option when the IP service preference indication corresponds to no preference for mobility.

45. The computer program product of claim 44, further comprising:
  code for sending an IPCP non-acknowledgment signal including an address option to the access terminal and granting PMIP service to the access terminal when the IP service preference indication corresponds to a preference for mobility and the IP Service Authorized Parameter indicates that PMIP is authorized; and
  code for sending an acknowledgment signal including no address option and granting CMIP service to the access terminal when the IP service preference indication corresponds to a preference for mobility and the IP Service Authorized Parameter indicates that PMIP is not authorized.

46. A hardware apparatus for wireless communication, comprising:
  means for establishing a data link with an access terminal;
  means for requesting an authentication/authorization server to authenticate the access terminal;
  means for receiving an IP Service Authorized Parameter from the authentication/authorization server, the IP Service Authorized Parameter for indicating the authorized IP service for the access terminal;
  means for configuring a network layer protocol according to the authorized IP service that corresponds to the IP Service Authorized Parameter and satisfies an IP service preference indication received from the authentication/authorization server on behalf of the access terminal; and means for configuring a mobility protocol according to the authorized IP service that corresponds to the IP Service Authorized Parameter and satisfies the IP service preference indication received from the authentication/authorization server on behalf of the access terminal.

47. The apparatus of claim 46, further comprising means for communicating the authorized IP service to the access terminal.

48. The apparatus of claim 46, wherein the authorized IP service comprises at least one of:
  Internet protocol version 4 (IPv4);
  Internet protocol version 6 (IPv6);
  client mobile Internet protocol version 4 (CMIPv4);
  client mobile Internet protocol version 6 (CMIPv6);
  IPv4 with proxy mobile Internet protocol version 4 (PMIPv4);
  IPv4 with proxy mobile Internet protocol version 6 (PMIPv6);
  IPv6 with PMIPv4; or
  IPv6 with PMIPv6,
  wherein IPv4 and IPv6 are simple IP services; CMIPv4 and CMIPv6 are CMIP services; and PMIPv4 and PMIPv6 are PMIP services.

49. The apparatus of claim 48, wherein an authorization of each of the IP services corresponds to a respective bit of the IP Service Authorized Parameter.

50. The apparatus of claim 46, further comprising:
  means for communicating the authorized IP service to the access terminal during an authentication phase of the establishing of the PPP connection;
  means for entering an IP configuration phase of the establishing of the PPP connection utilizing simple IP signaling in response to the IP Service Authorized Parameter indicating that PMIP service is authorized; and
  means for entering a second authentication phase utilizing CMIP signaling when the IP Service Authorized Parameter indicates that PMIP service is not authorized.

51. The apparatus of claim 50, further comprising:
  means for determining that the access terminal has requested an unauthorized IP service, or that the access terminal does not support IP service authorization during the authentication phase;
  means for entering an IP configuration phase of the establishing of the PPP connection utilizing simple IP signaling; and
  means for rejecting an IP configuration request from the access terminal and entering a second authentication phase utilizing CMIP signaling when the IP Service Authorized Parameter indicates that PMIP service is not authorized.

52. The apparatus of claim 46, further comprising:
- means for entering an IP configuration phase of the establishing of the PPP connection utilizing simple IP signaling; and
- means for rejecting an IP configuration request from the access terminal and entering a second authentication phase utilizing CMIP signaling when the IP Service Authorized Parameter indicates that PMIP service is not authorized.

53. The apparatus of claim 46, further comprising:
- means for receiving information from the access terminal during the establishing of the data link with the access terminal, the information from the access terminal indicating that the access terminal supports IP service authorization;
- means for sending an IP service authorization information packet to the access terminal after the receiving of the IP Service Authorized Parameter from the server, the IP service authorization information packet indicating which IP service the access terminal is authorized for; and
- means for receiving an acknowledgment from the access terminal to acknowledge the IP service authorization information packet.

54. The apparatus of claim 53, further comprising:
- means for determining that the access terminal has requested an unauthorized IP service, or that the access terminal does not support IP service authorization during the authentication phase;
- means for entering an IP configuration phase of the establishing of the PPP connection utilizing simple IP signaling; and
- means for rejecting an IP configuration request from the access terminal and entering a second authentication phase utilizing CMIP signaling when the IP Service Authorized Parameter indicates that PMIP service is not authorized.

55. The apparatus of claim 46, wherein the means for establishing the data link comprises means for receiving a packet from the access terminal indicating that the access terminal supports IP service authorization, the apparatus further comprising:
- means for performing a null PPP authentication;
- means for executing a network layer configuration without an IP address option;
- means for executing a CMIP authentication, wherein the IP Service Authorized Parameter is received from the authentication/authorization server;
- means for communicating the authorized IP service to the access terminal; and
- means for receiving an acknowledgment of the authorized IP service from the access terminal.

56. The apparatus of claim 46, wherein the IP service preference indication explicitly indicates the preferred IP service, and the means for configuring the network layer protocol comprises:
- means for receiving from the access terminal a parameter explicitly indicating the preferred IP service; and
- means for granting an IP service corresponding to the preferred IP service when the preferred IP service corresponds to an authorized IP service as indicated by the IP Service Authorized Parameter.

57. The apparatus of claim 46, wherein the IP service preference indication implicitly identifies the preferred IP service, and the means for configuring the network layer protocol comprises means for performing a CMIP-based IPCP, the apparatus further comprising:
- means for receiving an indication from the access terminal implicitly identifying the preferred IP service; and
- means for granting PMIP service to the access terminal when the preferred IP service corresponds to a preference for mobility and the IP Service Authorized Parameter indicates PMIP service is authorized.

58. The apparatus of claim 57, further comprising means for granting CMIP service to the access terminal when the preferred IP service corresponds to the preference for mobility and the IP Service Authorized Parameter indicates PMIP service is not authorized.

59. The apparatus of claim 57, wherein IP service preference indication comprises:
- a CMIP-based network-layer protocol configuration request including no address option when the IP service preference indication corresponds to a preference for mobility; and
- a CMIP-based network-layer protocol configuration request including an address option when the IP service preference indication corresponds to no preference for mobility.

60. The apparatus of claim 59, further comprising:
- means for sending an IPCP non-acknowledgment signal including an address option to the access terminal and granting PMIP service to the access terminal when the IP service preference indication corresponds to a preference for mobility and the IP Service Authorized Parameter indicates that PMIP is authorized; and
- means for sending an acknowledgment signal including no address option and granting CMIP service to the access terminal when the IP service preference indication corresponds to a preference for mobility and the IP Service Authorized Parameter indicates that PMIP is not authorized.

* * * * *